July 12, 1949.　　　　　C. PAULSEN　　　　　2,476,250
SHEET ASSEMBLING APPARATUS
Filed April 20, 1944　　　　　　　　　　　　　　13 Sheets-Sheet 4

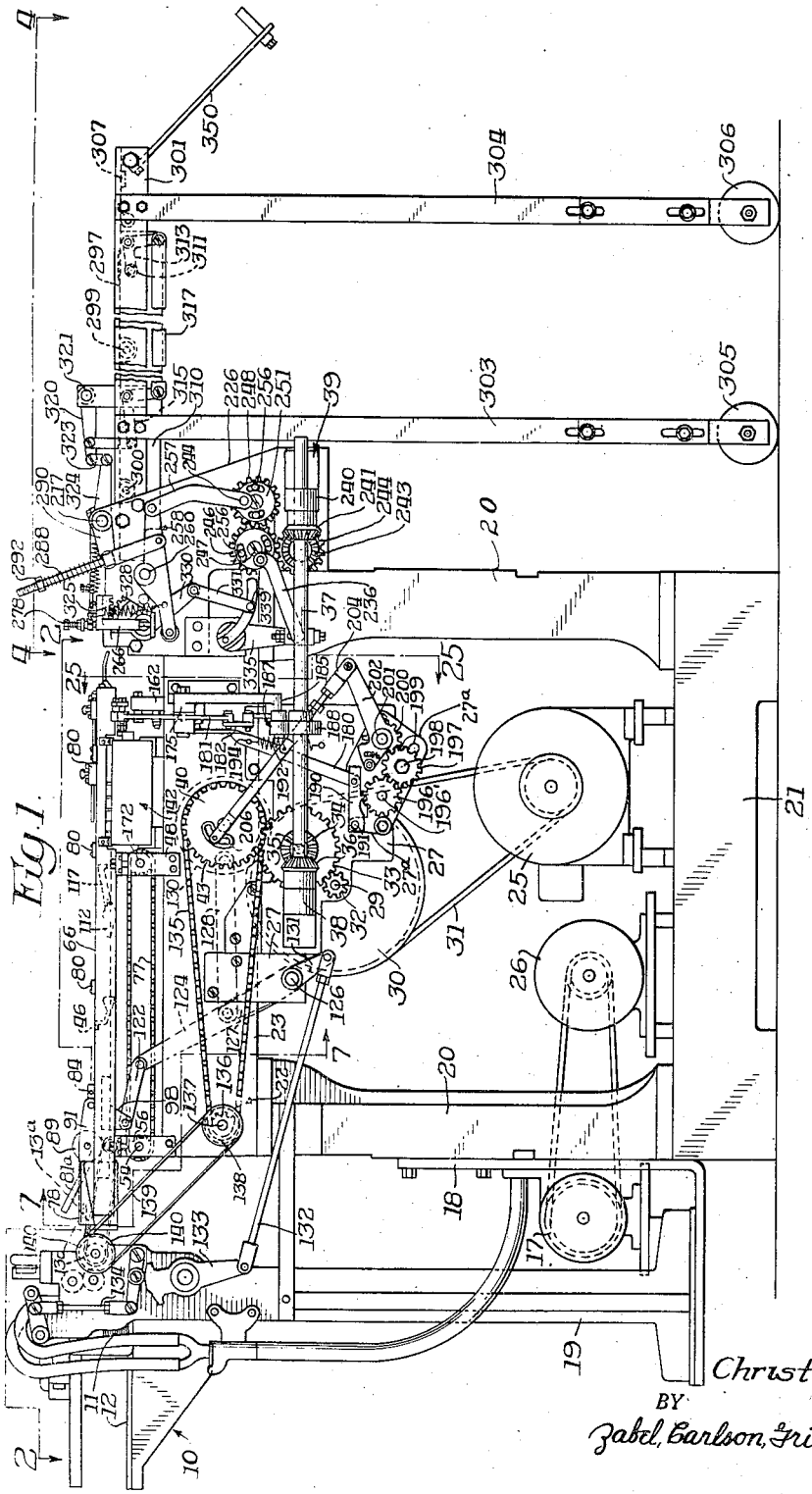

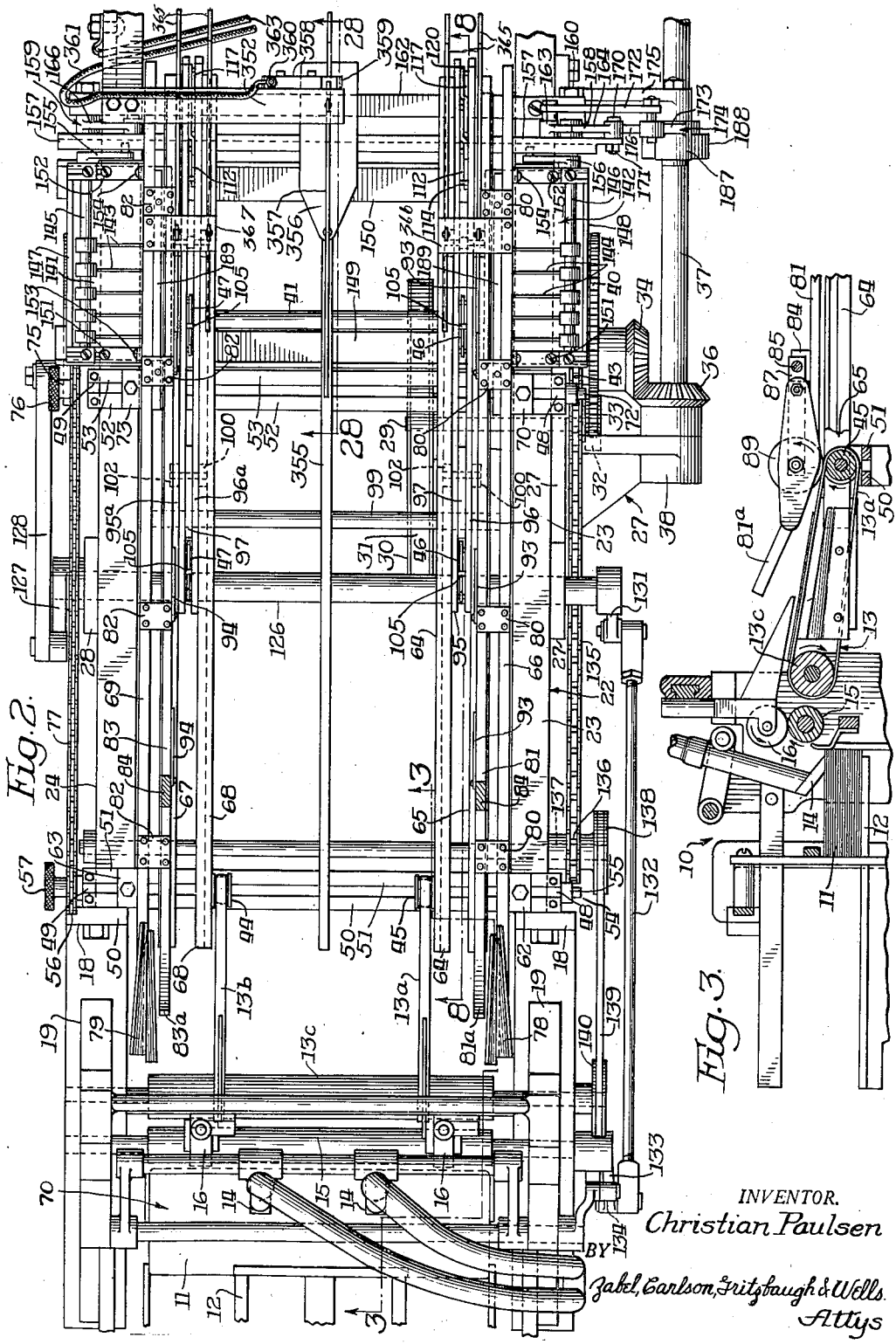

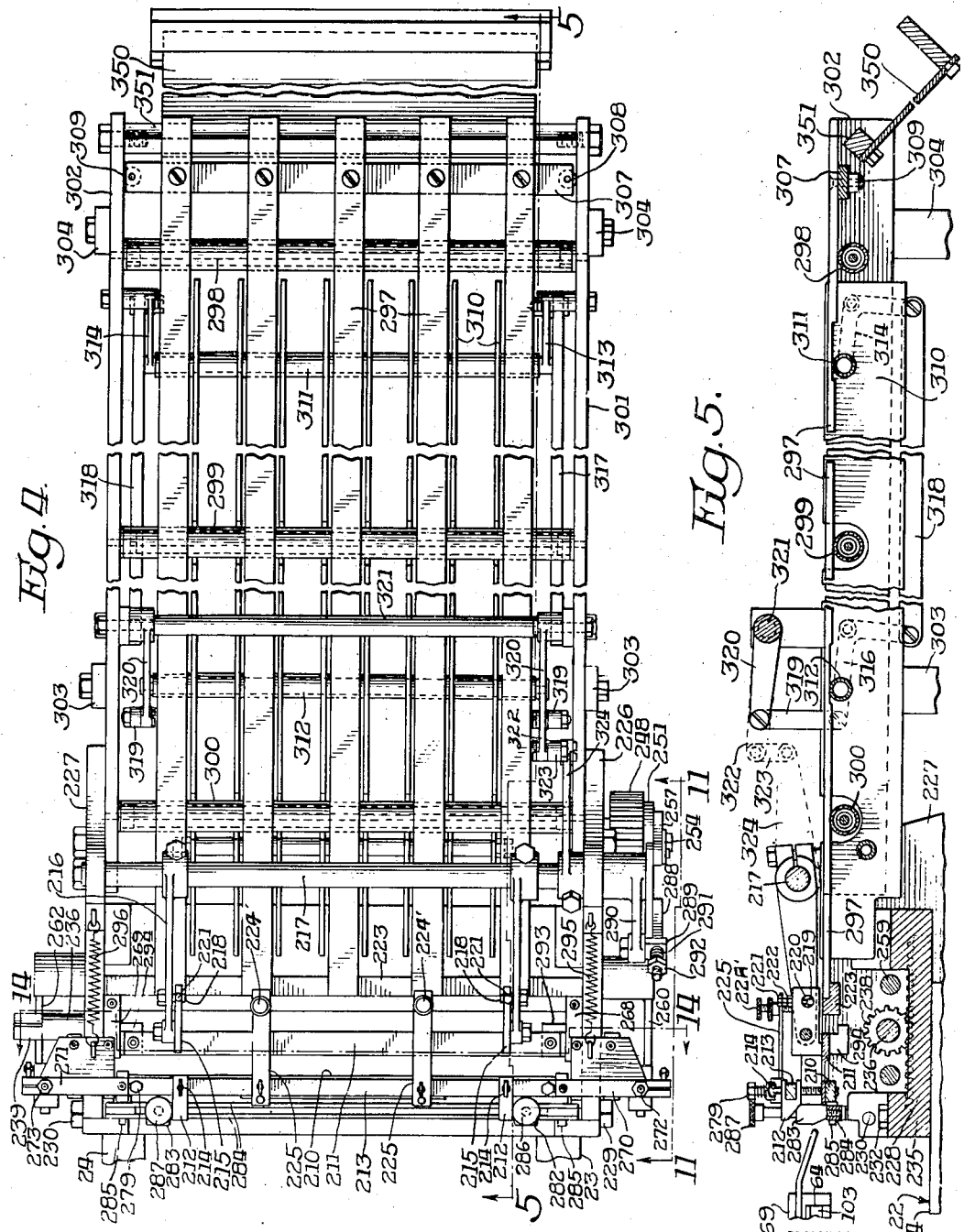

INVENTOR.
Christian Paulsen.
BY
Zabel, Carlson, Fritzbaugh & Wells.
Attys.

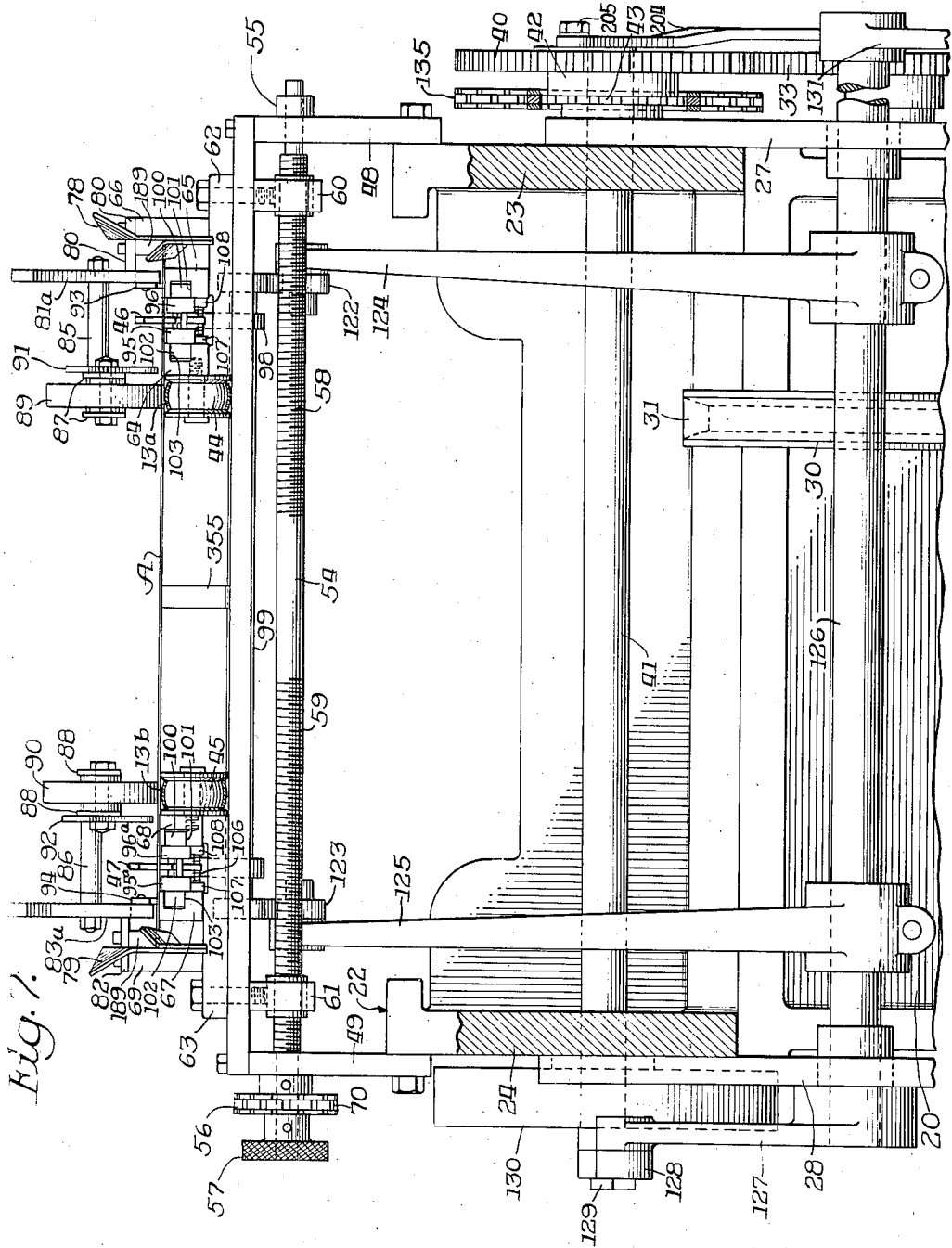

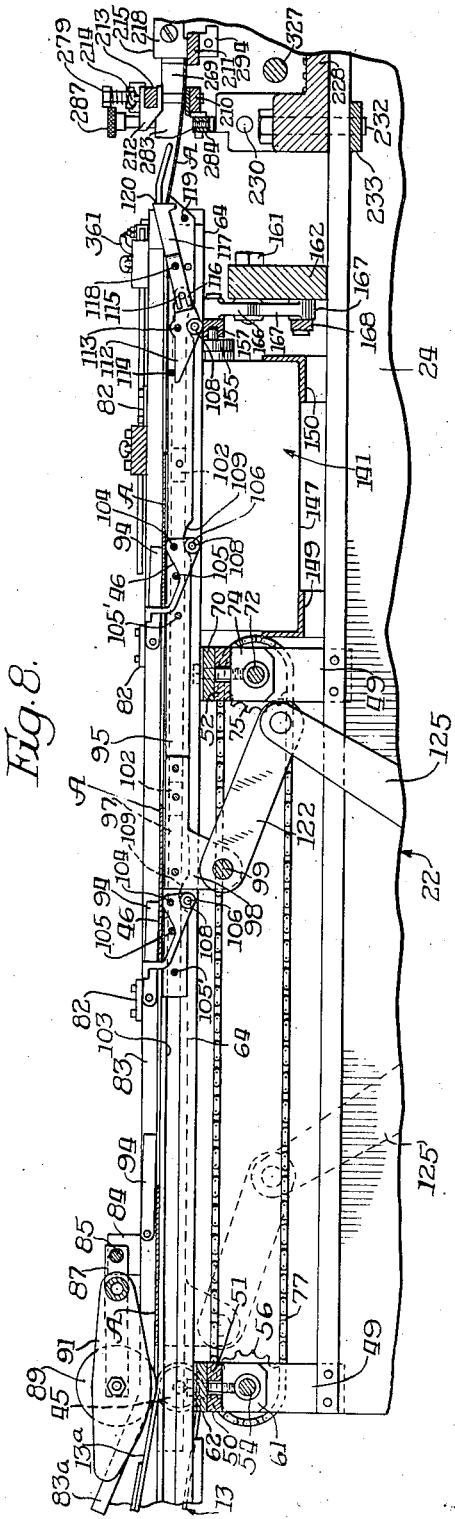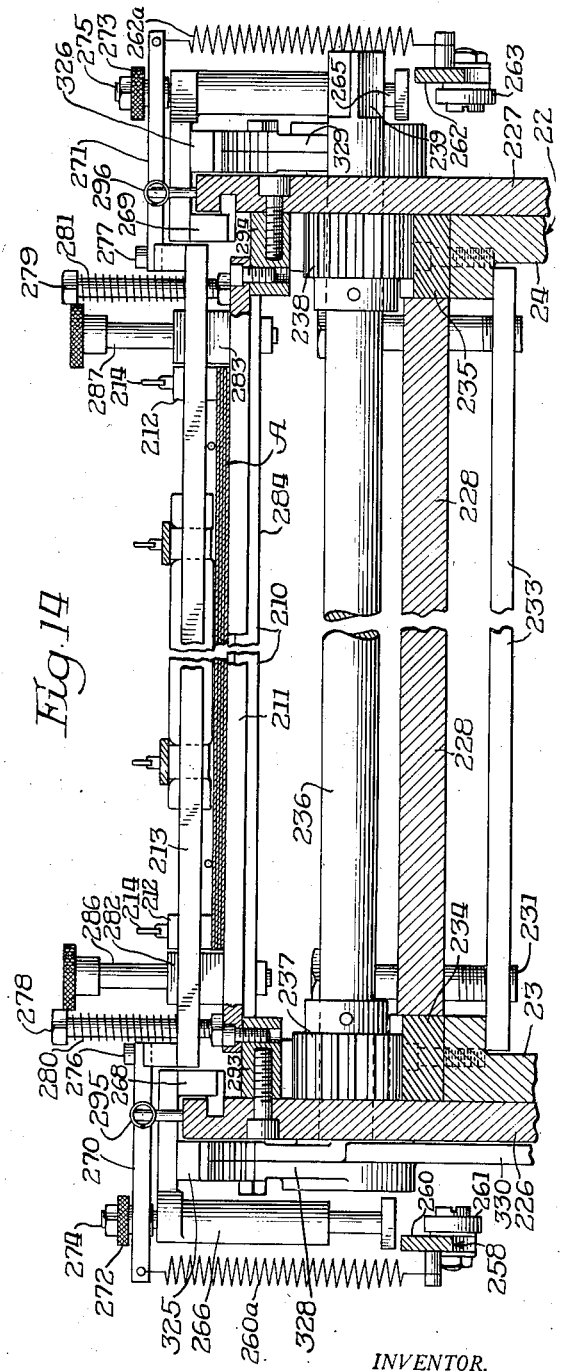
INVENTOR.
Christian Paulsen.
BY
Zabel, Carlson, Fritzbaugh & Wells
Attys

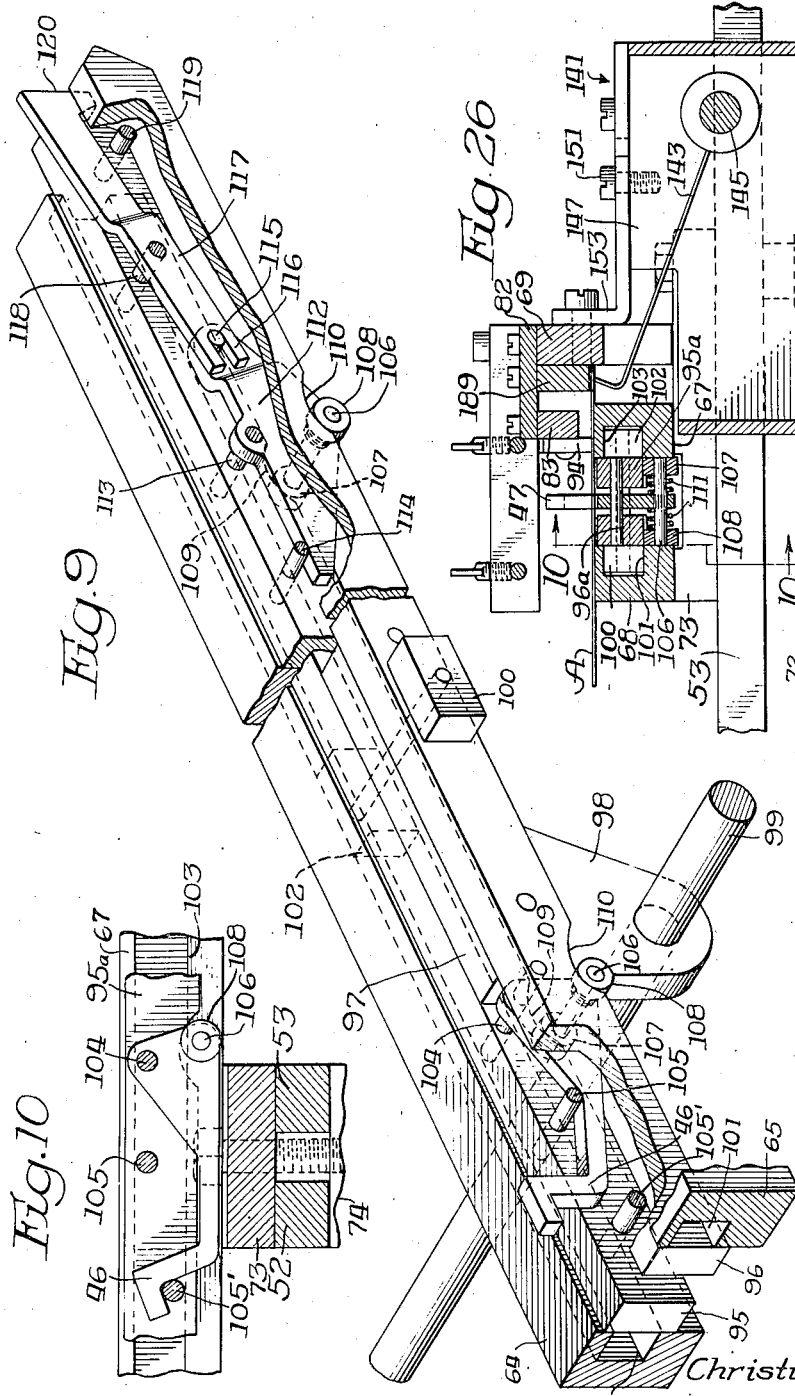

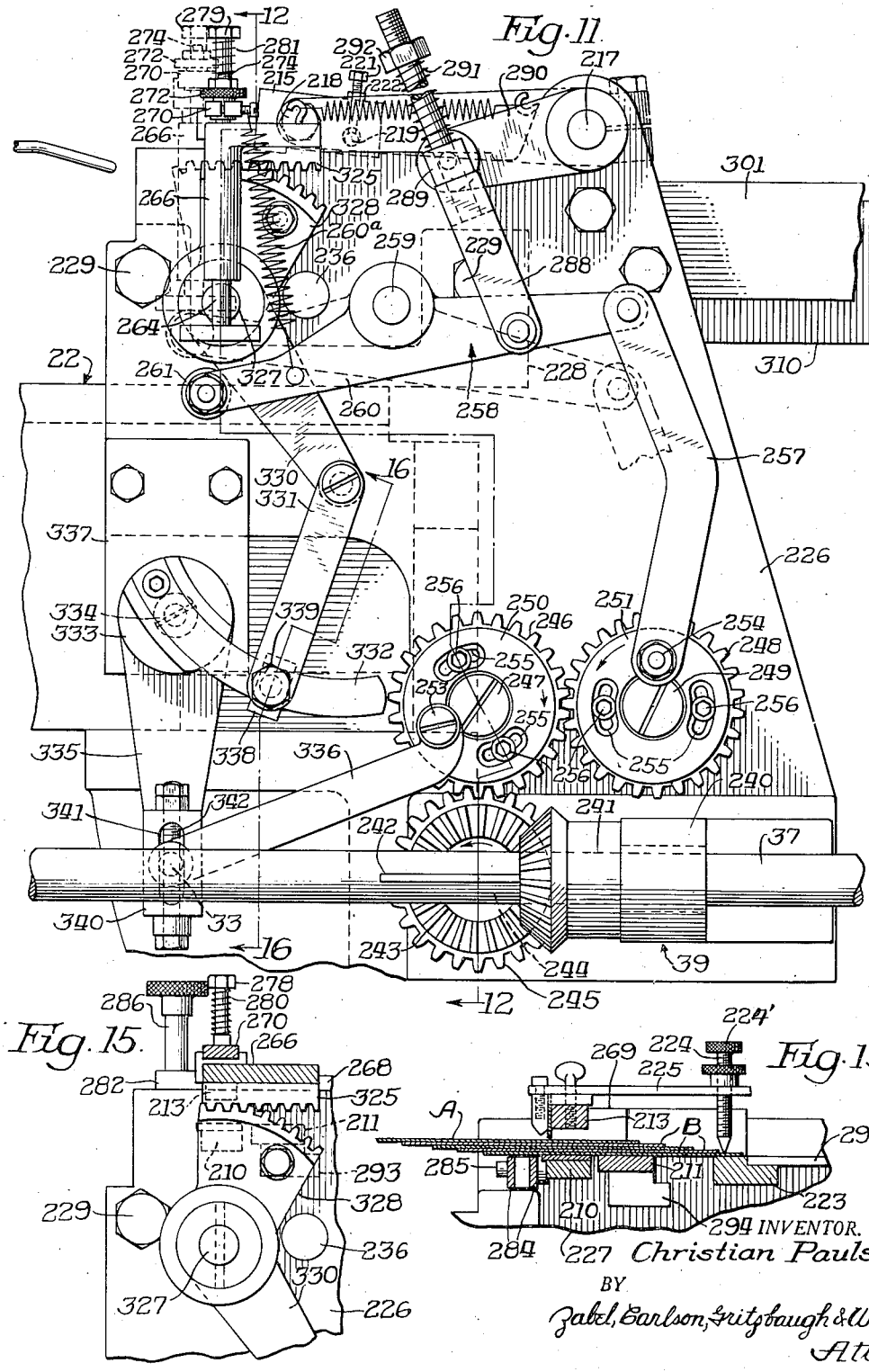

July 12, 1949.
C. PAULSEN
2,476,250
SHEET ASSEMBLING APPARATUS
Filed April 20, 1944
13 Sheets-Sheet 9
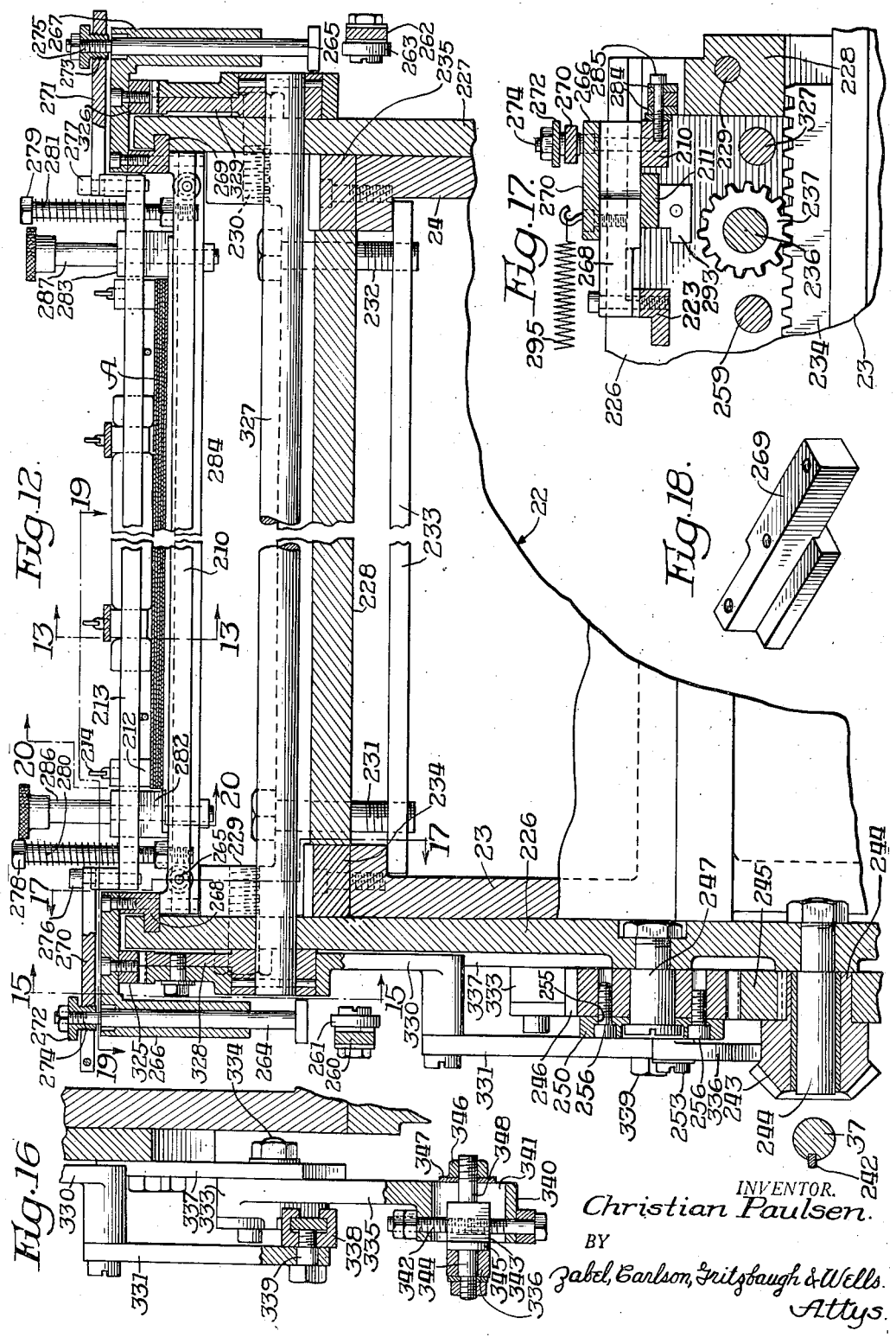
INVENTOR.
Christian Paulsen.
BY
Zabel, Carlson, Fritzbaugh & Wells.
Attys.

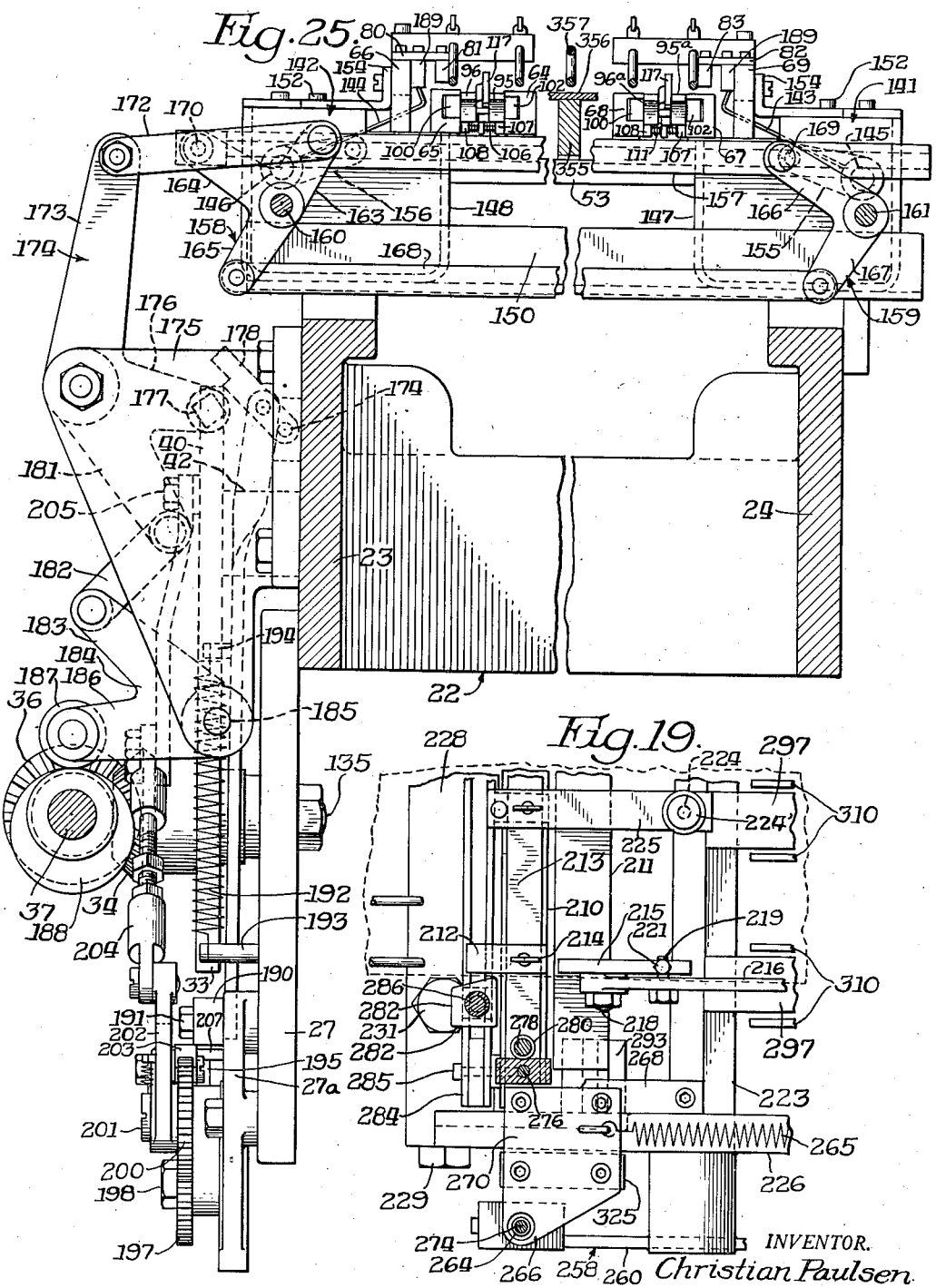

July 12, 1949. C. PAULSEN 2,476,250
SHEET ASSEMBLING APPARATUS
Filed April 20, 1944 13 Sheets-Sheet 11

INVENTOR.
Christian Paulsen.
BY
Zabel, Carlson, Fritzbaugh & Wells
Attys

July 12, 1949.  C. PAULSEN  2,476,250
SHEET ASSEMBLING APPARATUS
Filed April 20, 1944  13 Sheets-Sheet 12

INVENTOR.
Christian Paulsen.
BY
Zabel, Carlson, Fritzbaugh & Wells.
Attys

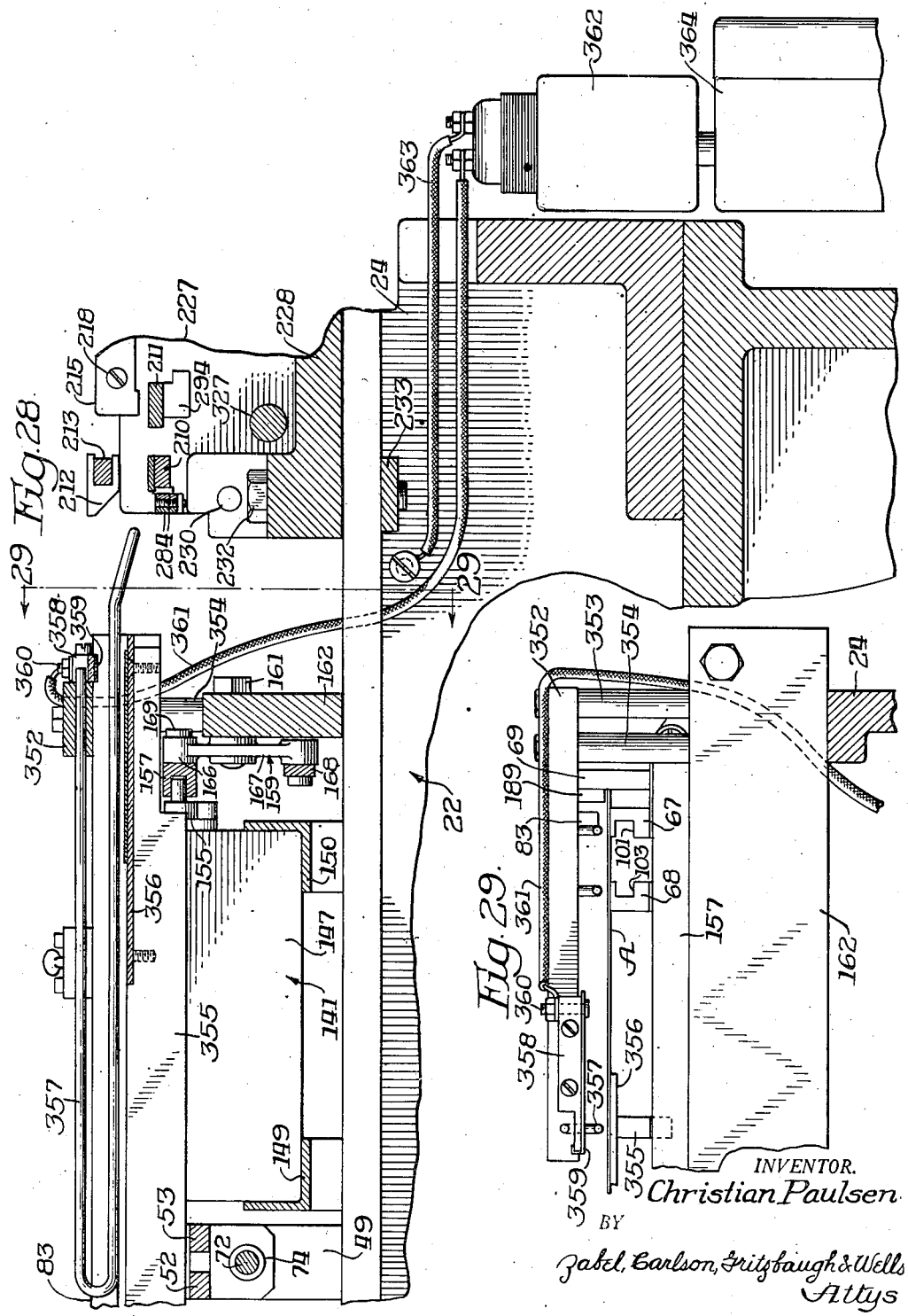

Patented July 12, 1949

2,476,250

UNITED STATES PATENT OFFICE 2,476,250

SHEET ASSEMBLING APPARATUS

Christian Paulsen, Fair Lawn, N. J., assignor to Ditto, Incorporated, Chicago, Ill., a corporation of West Virginia Application April 20, 1944, Serial No. 531,855

28 Claims. (Cl. 270—58)

This invention relates to sheet assembling apparatus of the type shown in my United States Letters Patent No. 2,205,433. The sheet assembling apparatus is adapted to assemble a selected number of sheets in a group so that a portion of each sheet in the group is exposed to receive printed, typed or written material while the remaining portion of each sheet, except the top sheet, is covered by superposed sheets of the group. My prior patent discloses and claims a machine for assembling and securing together sheets to provide units of the type described above.

It is the purpose of the present invention to provide novel improvements in a machine of the type referred to whereby the assembly and securing together of sheets with any desired degree of overlap are accomplished at high speed with assurance of accuracy in the spacing of the sheets. My invention contemplates a machine of the character described wherein sheets that have been cut to uniform size are advanced by mechanisms that insure proper spacing, treated with adhesive at the desired places and placed together under pressure and then advanced unmolested for a time sufficient to insure drying of the adhesive and delivered to a receiving tray or other receiving means. Means are provided to stop the machine in the event of failure of the feeding mechanism to provide a sheet at the proper time for incorporation into a group.

One form of the invention is embodied in a machine having means to receive sheets from a known suction type device which lifts sheets from a stack and delivers them one at a time. This means comprises an advancing mechanism that takes the sheets step by step away from the delivery point and to a station where they may be treated with adhesive. An adhesive applying means is operable to suitably apply adhesive in spots to the sheets and when a selected number of sheets have been so treated to skip a sheet to thus provide a break in the continuity. The machine has means to place the adhesive-carrying sheets in overlapped relation with great accuracy in the degree of overlap. The machine also embodies means acting automatically to stop the operation when a sheet or sheets becomes stuck or clogged before reaching the overlapping point.

When the sheets are overlapped they are forced together under pressure, then advanced as a group, then held stationary while the next sheet is placed in overlapped position, and thereafter advanced again. Owing to the extreme accuracy necessary in overlapping the sheets, this feature of the machine is quite important. It is evident that in using these units of sheets on duplicating machines error in the overlapping of sheets in a unit would in many cases make it impossible to use the same.

The overlapped and united sheets must be maintained in their correct position for a short time to insure setting of the adhesive. The machine of the present invention embodies means whereby this may be accomplished while the sheets are advanced without interfering with the overlapping and pressing together of the sheets.

The objects and advantages of my invention will appear more fully as the description proceeds, reference being made to the accompanying drawings wherein a preferred embodiment of the invention is shown. It is to be understood however that the drawings and description are illustrative only and are not to be taken as limiting the invention except insofar as it is limited by the claims.

In the drawings:

Figure 1 is a view in side elevation of a sheet assembling apparatus embodying my invention;

Figure 2 is an enlarged plan view of a portion of the apparatus as indicated by the line 2—2 on Figure 1;

Figure 3 is a fragmentary sectional view taken on the line 3—3 of Figure 2;

Figure 4 is an enlarged plan view of another portion of the apparatus as indicated by the line 4—4 on Figure 1;

Figure 5 is a fragmentary sectional view taken on the line 5—5 of Figure 4;

Figure 7 is an enlarged fragmentary sectional view taken on the line 7—7 of Figure 1;

Figure 8 is a fragmentary sectional view taken on the line 8—8 of Figure 2;

Figure 9 is a fragmentary perspective view illustrating a part of the sheet advancing means shown in plan view in Figure 2 and in section in Figure 8;

Figure 10 is a fragmentary detail view of certain parts shown in Figure 9;

Figure 11 is an enlarged fragmentary view in side elevation looking in the direction indicated by the lines 11 on Figure 4;

Figure 12 is a sectional view taken on the line 12—12 of Figure 11;

Figure 13 is a fragmentary sectional view taken on the line 13—13 of Figure 12;

Figure 14 is a fragmentary sectional view taken on the line 14—14 of Figure 4;

Figure 15 is a fragmentary sectional view taken on the line 15—15 of Figure 12;

Figure 16 is a fragmentary sectional view taken on the line 16—16 of Figure 11;

Figure 17 is a fragmentary sectional view taken on the line 17—17 of Figure 12;

Figure 18 is a perspective view of a guide block shown in section in Figure 12;

Figure 19 is a fragmentary sectional view taken on the line 19—19 of Figure 12;

Figure 25 is a fragmentary sectional view taken on the line 25—25 of Figure 1;

Figure 26 is a fragmentary sectional view taken on the line 26—26 of Figure 24;

Figure 28 is a fragmentary sectional view taken on the line 28—28 of Figure 2; and Figure 29 is a fragmentary sectional view taken on the line 29—29 of Figure 28.

Figure 27:
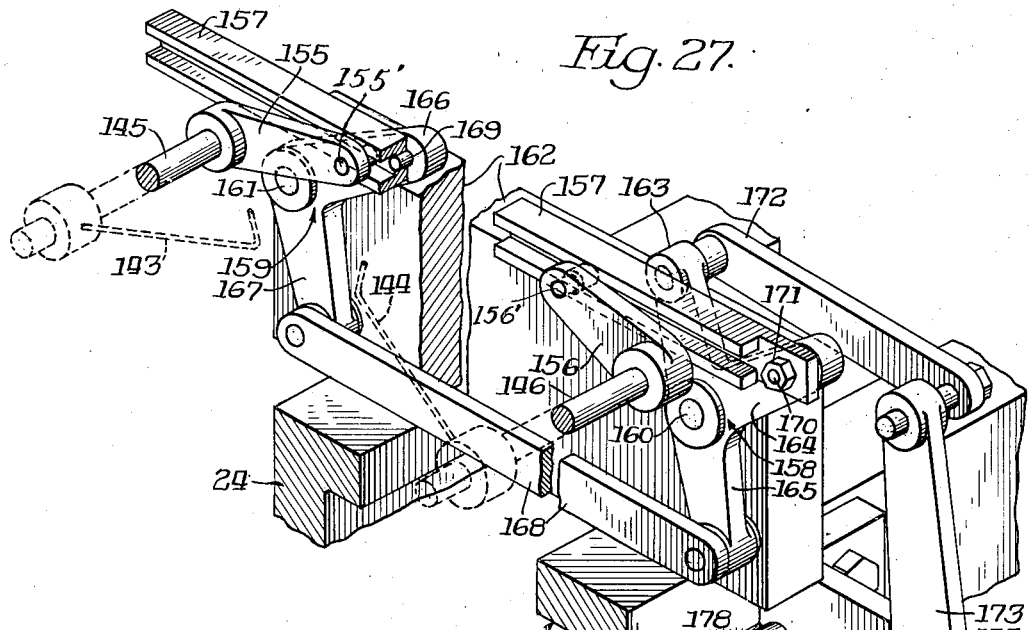
Figure 27 is a fragmentary perspective view with certain parts left out to illustrate the parts for operating the adhesive applying means.

Referring now to the drawings and in particular to Figures 1 to 5, inclusive. These drawings illustrate a sheet assembling apparatus embodying my invention wherein sheets cut to a desired size are fed by a known sheet feeder 10. This feeder is not shown in detail since it is not a part of applicant's invention. Figure 3 of the drawings illustrates the parts which cooperate to deliver sheets from a stack 11 on a table 12 to a conveyor 13. A suction device 14 engages a sheet on the stack 11 and lifts it to position to engage two feed rollers 15 and 16 that advance the sheet to the conveyor 13. The suction device is operated by a fan 17 (Figure 1) which is mounted on a bracket 18 that supports a pedestal 19 for the feeder. The bracket is bolted to one upright 20 of a supporting frame for the assembling apparatus.

The supporting frame for the apparatus comprises a base 21, two uprights 20 and a rectangular frame 22. The uprights 20 are of inverted U-shape and the ends of the frame 22 rest on these uprights. The frame 22 has heavy side pieces 23 and 24 which provide the supporting means for the various elements of the apparatus. A motor 25 mounted on the base 21 supplies power to drive the assembling apparatus. A second motor 26 on the base 21 drives the fan 17. The side pieces 23 and 24 carry depending brackets 27 and 28 in which a shaft 29 (Figures 1 and 24) is journaled. This shaft has a large pulley 30 fixed thereon which is driven by a belt 31 from the motor 25. The shaft 29 has a pinion 32 thereon meshing with a gear 33. The gear 33 is fixed to the hub of a bevel gear 34 which is journaled on a stub shaft 35 (Figs. 1, 24 and 25) that is fixed on the bracket 27. The bevel gear 34 meshes with a bevel gear 36 that is fixed to a main shaft 37 that runs lengthwise of the apparatus and is journaled in two supporting brackets 38 and 39. The gear 33 meshes with another gear 40 (see Figures 1 and 7) which is fixed on a shaft 41. The shaft 41 extends through the side pieces 23 and 24 and is journaled therein. The gear 40 has a hub 42 on which there is also fixed a sprocket wheel 43. The connections to the parts driven by the gears and shafts described will be pointed out more in detail in connection with the description of the parts hereinafter given.

The conveyor 13 has two feed belts 13a and 13b (Figures 2, 3 and 7) which travel on a driven roller 13c that is part of the feeder. However the feed belts 13a and 13b at their delivery ends ride on two pulleys 44 and 45 (Figure 7) that are mounted for movement toward and away from each other, together with sheet advancing means (described more fully below) to accommodate for sheets of different lengths. The belts may be moved lengthwise on the roller 13c as the pulleys 44 and 45 are adjusted.

Figure 24:
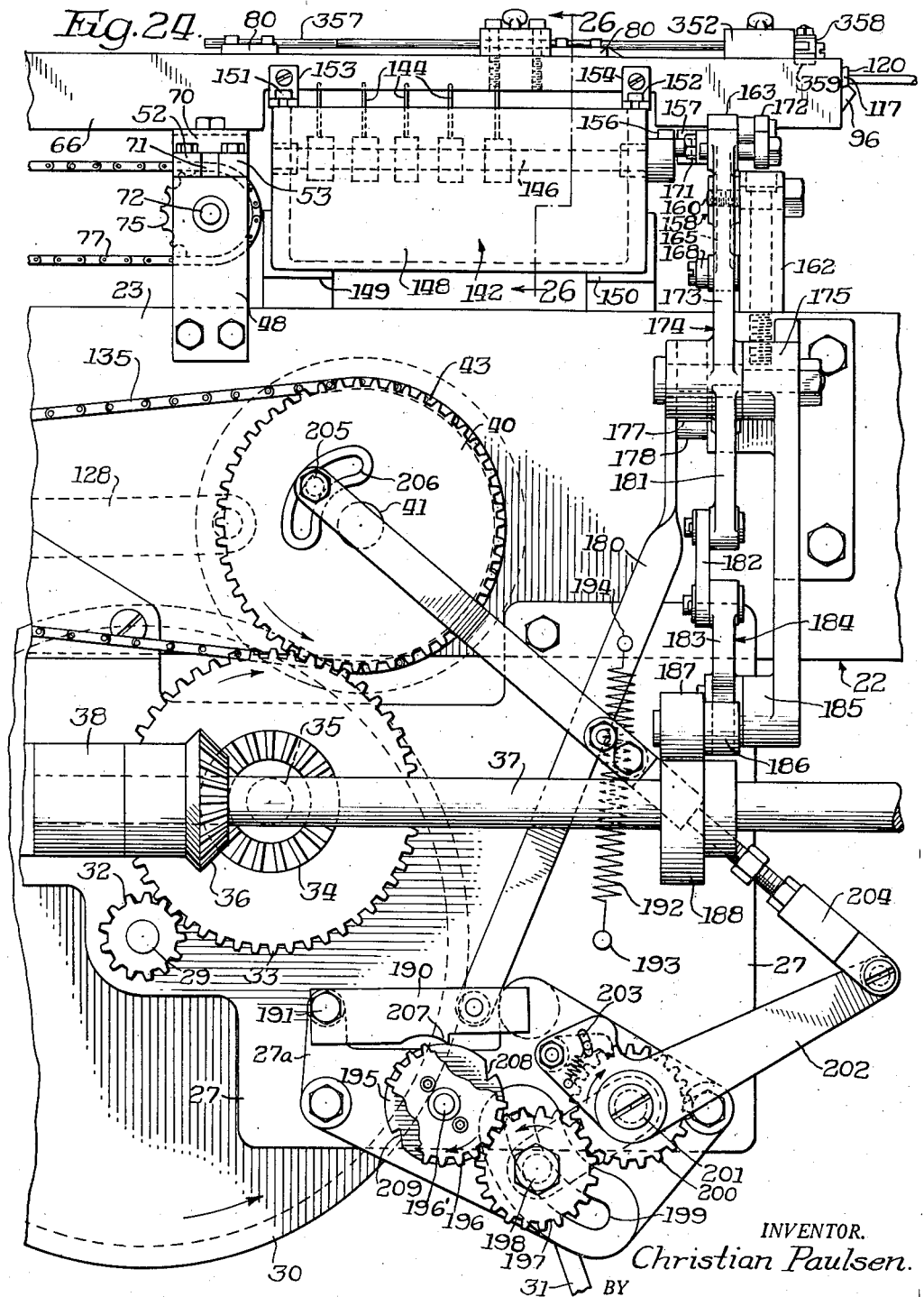
Figure 24 is an enlarged fragmentary view in side elevation of a part of the apparatus illustrating the driving connections for the adhesive applying mechanism.

In order to advance sheets from the conveyor 13 I provide a series of sheet advancing members 46 at one side of the apparatus and another series of sheet advancing members 47 at the other side of the apparatus. In order to mount these members I provide two spaced posts 48 on the outside of the side piece 23 and two like spaced posts 49 on the outside of the side piece 24 (Figures 7, 8 and 24). These posts are bolted to the side pieces as illustrated in Figure 24. The front pair of posts 48—49 are connected at their top ends by two spaced bars 50 and 51 while the rear posts 48 and 49 are connected by two spaced bars 52 and 53. The front pair of posts also have journaled therein a shaft 54 (Figure 7). The shaft has a collar 55 fixed thereon at one end. A sprocket wheel 56 and a knurled handle 57 are fixed to the other end of the shaft. The shaft has a righthand screw threaded portion 58 extending from the center out toward the post 48 and a lefthand screw threaded portion 59 extending from the center out toward the post 49. A threaded block 60 is mounted on the threaded portion 58 and another threaded block 61 is mounted on the portion 59. The blocks 60 and 61 have reduced portions extending upwardly through the space between the two bars 50—51. Tie plates 62—63 are bolted to the upper ends of the reduced portions. The tie plate 62 serves as one support for two slotted bars 64 and 65 and as a support for a main side guide bar 66. Preferably the bars are spot welded to the plate 62, although any suitable fastening may be used. In a similar fashion the tie plate 63 serves as a support for two slotted bars 67 and 68 and a side guide bar 69. By turning the shaft 54 the plates 62 and 63 and the bars thereon can be moved toward and away from each other to vary the space through which a sheet must pass from the conveyor 13.

The bars 64, 65, 66 are also fixed upon a tie plate 70 that is fastened to a block 71 (see Figure 24) which is threaded to receive a shaft 72 like the shaft 54. The bars 67, 68 and 69 are fixed upon a tie plate 73 which is fastened to a block 74 (see Figures 8 and 26) which is threaded to receive the shaft 72. The shaft 72 is journaled in the rear posts 48—49 and has a sprocket wheel 75 and a knurled handle 76 fixed thereon. The sprocket wheels 56 and 75 are connected by a sprocket chain 77 so that adjustment of one shaft effects adjustment of the other. Thus when either knurled handle is turned the sets of guide bars are moved bodily toward or away from each other.

The bars 64 and 68 carry stub shafts that support the pulleys 45 and 44 so that these pulleys move with the bars 64 and 68. The bars 66 and 69 have sheet guide members 78 and 79 at their front ends. These bars also have sheet top guides secured thereto. The bar 66 has a plurality of plates 80 bolted thereto. These plates carry a bar 81. The bar 69 has a plurality of plates 82 bolted thereto. These plates carry a bar 83. The bars 81 and 83 extend upwardly at their front ends as indicated at 81a and 83a in Figure 7. The bars 81 and 83 carry blocks 84 on which two stub shafts 85—86 are mounted (Figure 7). These stub shafts extend toward each other and have links 87 and 88 pivoted thereon. These links in turn carry light rollers 89 and 90 that are adapted to ride upon the pulleys 44 and 45, respectively. Also the links carry two guide plates 91 and 92 that cooperate with the belts 13a and 13b to guide sheets to the rollers. The bars 81 and 83 have light presser strips 93 and 94 pivoted thereon at spaced intervals lengthwise of the bars. These presser bars are adapted to ride over sheets as they advance from the pulleys 44, 45 and the rollers 89 and 90 and hold the sheets in place.

The sheet advancing members 46 are carried by two spaced sliding bars 95 and 96 (see Figure 9). These bars are spaced apart by a block 97 and secured to the block 97 to move with it. The block 97 has a depending ear 98 which is mounted on a cross shaft 99. The cross shaft 99 is operated in a manner which will be described more fully hereinafter to slide the bars lengthwise. The bars 95 and 96 have spaced lugs 100 riding in a groove 101 provided in the bar 65. Likewise the bar 95 has spaced lugs 102 thereon which ride in a groove 103 provided in the bar 64. The members 46 are pivotally mounted by pins 104 to the bars 95 and 96 and are limited in rocking movement about the pivot by spaced pins 105 and 105' that are mounted in the bars 95 and 96 above and below the members 46. The members 46 carry shafts 106 (see Figures 9, 10 and 26). These shafts carry friction rollers 107 and 108 that ride in corresponding grooves 109 and 110 formed in the lower edges of the bars 95 and 96. Springs 111 interposed between the member 46 and the rollers 107 and 108 urge the rollers outwardly against the bars 64 and 65. In operation if the bars 95, 96 are moved toward the left as shown in Figures 8, 9 and 10 the friction of the friction rollers 107 and 108 against the faces of the stationary bars 64 and 65 will cause the friction rollers to tend to travel from the position shown in Figure 9 to that shown in Figure 10. The result is to cause the member 46 to move from the position shown in Figure 9 to that shown in Figure 10 where it engages the pin 105' and is down below the plane of the top surfaces of the bars 64 and 65. Now, however, when the movement is reversed and the bars 95 and 96 are moved toward the right the friction of the rollers 107 and 108 against the bars 64 and 65 will cause the members 46 to move in a clockwise direction about the pivots 104 until they strike the pins 105. In this position the sheet advancing members 46 are positioned to move sheets along the surfaces of the bars 64, 65, 67 and 68.

The sheet advancing members 47 which are located at the opposite side of the apparatus from the members 46 are carried by sliding bars 95a and 96a which are mounted in precisely the same manner as the bars 95 and 96. The friction rollers 107 and 108 are of course provided on all of the members 47 as well as on the members 46, and pins 105 and 105' are likewise employed in connection with the members 47 the same as they are in connection with the members 46.

At the extreme righthand end of the advancing mechanism embodying the members 46 and 47 I provide slightly different sheet advancing members so as to push the sheets completely beyond the ends of the bars 64, 65, 67 and 68. One of these sheet advancing members is shown best in Figure 9 as comprising a rocker arm 112 pivoted on a pin 113 that is mounted in the bars 95 and 96. This rocker arm carries friction rollers 107 and 108 just like the members 46 and 47 but its lefthand end engages a stop pin 114 to limit the upward movement thereof. At its righthand end the rocker arm 112 has a pin 115 which fits in the bifurcated end 116 of a pivoted sheet advancing member 117. This sheet advancing member is pivoted by a pin 118 to the bars 95 and 96 and has its downward movement limited by a stop pin 119. The sheet advancing member 117 has an end face 120 facing in the direction of movement of the sheets so that when it is elevated as shown in Figures 8 and 9 it will serve to push sheets in the manner indicated in Figure 8. It will be evident from an examination of Figure 9 that when the bars 95 and 96 are moved to the left the resulting movement of the rocker arm 112 will be counterclockwise so as to raise the pin 115 and lower the sheet engaging end of the member 117 below the top surfaces of the bars 64 and 65. The bars 95a and 96a carry a sheet advancing device 121 similar in all respects to the mechanism just described as carried by the bars 95 and 96.

The means for moving the bars 95, 96, 95a and 96a (Figs. 7 and 8) comprises links 122 and 123 which are pivoted to the cross shaft 99 and which are pivoted to two crank arms 124 and 125. These crank arms are carried by a rock shaft 126 that is journaled in the brackets 27 and 28. The rock shaft 126 is connected by a lever arm 127 and a link 128 to a pin 129 on a disc 130 that is fixed on the shaft 41. The shaft 41 is of course driven by the gear 40 and the rotation of this shaft effects rocking of the shaft 126 through the link and lever mechanism just described.

The crank arms 124 and 125 have sufficient travel to move the bars 95a and 96a from the position shown in Figure 1 to the position shown in Figure 8 in full lines. The full line position of the crank arms shown in Figure 1 is indicated in dotted line position in Figure 8. It will be evident from an inspection of Figure 8 that the members 46 and 47 will be moved far enough to the left in the dotted line position shown in Figure 8 to engage behind a sheet that has been delivered by the conveyor 13. The rock shaft 126 also carries a lever arm 131 which is connected by a link 132 (see Figure 1) to an operating cam lever 133 that actuates a lifting mechanism 134 of the sheet feeding apparatus 10. The sheet feeding apparatus is thus operated in timed relation to the advance of sheets by the members 46 and 47. The sprocket wheel 43 is connected by a chain 135 to a sprocket wheel 136 that is mounted on a stub shaft 137 which also carries a pulley 138 fixed to the sprocket wheel 136. A belt 139 on the pulley 138 drives a pulley 140 which in turn actuates the roller 13c of the conveyor 13.

As the sheets are advanced by the members 46 and 47 they pass over two adhesive applying devices 141 and 142 (see Figures 2, 8, 24, 25 and 26). The sheets are left in position over the adhesive applying devices while the members 46 and 47 are retracted and returned to position to advance an additional sheet, and during this stationary period of the sheets adhesive is applied to them by adhesive applying fingers 143 of the device 141 and fingers 144 of the device 142. These fingers are mounted on rock shafts 145 and 146, respectively, and the rock shafts 145 and 146 are operated by duplicate mechanisms at opposite sides of the apparatus, which will be described more fully hereinafter. The fingers normally rest in two adhesive containing tanks 147 and 148 which are supported upon angle irons 149 and 150 that extend across the apparatus and are fixed to the side pieces 23 and 24. The tanks are removable and are provided with headed pins 151 and 152 which are adapted to engage the bifurcated ends of two brackets 153 and 154 mounted on each of the bars 66 and 69 (see Figs. 24 and 26).

The shafts 145 and 146 are of course journaled in the tanks and extend through the tank walls where they are provided with crank arms 155 and 156. The crank arms 155 and 156 have pins 155' and 156' in their free ends which slide in a bar 157 (see Figures 24, 25 and 27) that is carried by two bell cranks 158 and 159. The bell cranks 158 and 159 are pivoted on studs 160 and 161 that are provided on a cross bar 162 that is bolted to the side pieces 23 and 24. The bell crank 158 has three arms 163, 164 and 165 and the bell crank 159 has two arms 166 and 167. The arms 165 and 167 are connected by a link 168 so that the two bell cranks must move in unison. The arm 166 of the bell crank 159 has a pin 169 which extends into the bar 157 and acts as a support therefor. Likewise the arm 164 of the bell crank 158 has a pin 170 which extends through one end of the bar 157 and a nut 171 secures the bar in place on the pin 170. The arm 163 has its free end connected by a link 172 to one arm 173 of another three-armed bell crank 174 which is pivoted on a bracket 175 that is secured to the side piece 23. A second arm 176 of the bell crank 174 carries a rectangular pin 177 which is adapted to be engaged by a latch 178 that is pivoted to the bracket 175 by a pin 179 and is actuated by a link 180. The third arm 181 of the bell crank 174 is connected by a link 182 to one arm 183 of another bell crank 184 that is pivoted at 185 to the bracket 175. The bell crank 184 has another arm 186 which carries a cam roller 187 at its free end and the cam roller rides upon a cam 188 that is fixed on the main drive shaft 37.

As described hereinbefore, the main drive shaft 37 is driven from a gear 33 that meshes with the gear 40 on the shaft 41 which actuates the rock shaft 126 that in turn operates the sheet advancing members 46 and 47. The timing is such therefore that the cam 188 on the shaft 37 operates the train of bell cranks 184, 174, 158 and 159 to raise and lower the bar 157 in timed relation to the advance of sheets by the members 46 and 47 so that the crank arms 155 and 156 may actuate the rock shafts 145 and 146 to cause them to bring the adhesive applying fingers 143 and 144 into engagement with the sheets while the sheets are at rest and the members 46 and 47 are moving to the left as shown in Figure 8 and are retracted as shown in Figure 10. The sheets therefore are stationary during the application of the adhesive. An inspection of Figure 26 will show that the adhesive applying fingers engage the sheets at their extreme outer edges. Suitable bars such as that indicated at 189 in Figure 26 are located directly above the fingers 143 and 144, these bars being secured to the plates 80 and 82.

In the assembly of the sheets into groups it is desirable at intervals to cause the adhesive applying fingers to skip a sheet so that only a certain number of sheets will be adhered together in each group. The function of the latch 178 and its actuating link 180 is to effect a skipping of a sheet by the fingers 143 and 144 in the manner which will now be described.

Referring now to Figure 24, the link 180 is shown as extending downwardly to a latch arm 190 which is pivoted at 191 on a plate 27a that is bolted to the bracket 27. A spring 192 has one end connected to a pin 193 on the bracket 27 and the other end connected to a pin 194 on the link 180. The spring is under tension tending to pull the link 180 down. The latch arm 190 rides on a rotating disc 195 which has a gear 196 fixed thereto, the disc and the gear being mounted on a stub shaft 196'. The plate 27a is bolted to the bracket 27. The gear 196 meshes with another gear 197 which is rotatably journaled on a shaft 198 that is adjustably mounted in a slot 199 of the plate 27a. The gear 197 meshes with a gear 200 which is pivoted on a stub shaft 201 which also pivotally mounts a lever 202 which carries a pawl 203, the pawl 203 being adapted to engage the teeth of the gear 200 and lock it when the lever 202 is moved in a clockwise direction. The lever arm 202 is actuated by a link 204 which is connected to the gear 40 at 205 by an adjustable pin and a slot 206 in the gear. Upon each rotation of the gear 40 the pawl 203 will advance the gear 200 and through it the gears 197 and 196. Since each rotation of the gear 40 means the advance of the sheet, the number of rotations necessary to move the latch arm 190 so that a projection 207 thereon will move from one notch 208 to another notch 209 in the member 195 will determine the number of sheets that will be advanced to the adhesive fingers before the latch arm 190 drops down due to the projection 207 falling in the notch 208 or 209. When the arm 190 drops down the link 180 is moved downward to cause the latch 178 to fall in the position to engage the squared pin 177 on the crank arm 176. This engagement takes place when the arm 176 of the bell crank 174 is raised. When the arm 176 is raised the parts are in position where the adhesive applying fingers are lowered into the adhesive and the cam 188 has raised the cam roller 187. It is evident that when the latch 178 drops into position to engage the pin 177 the adhesive applying fingers will be held down until another rotation of the gear 40 steps the gears 200, 197 and 196 ahead to move the projection 207 out of the notch 208. That of course will release the latch 178 and allow the bell crank 174 to operate. When it is desired to change the number of sheets in a group the only change necessary in the mechanism is to remove the units 195—196 and substitute another unit having a different spacing of the notches 208, 209. For example, if the unit shown in place in Figure 24 of the drawings causes twelve sheets to be adhered together before skipping a sheet, a changed unit might add another notch in the member 195 and then you would get only eight units adhered together before skipping one.

Figure 20:
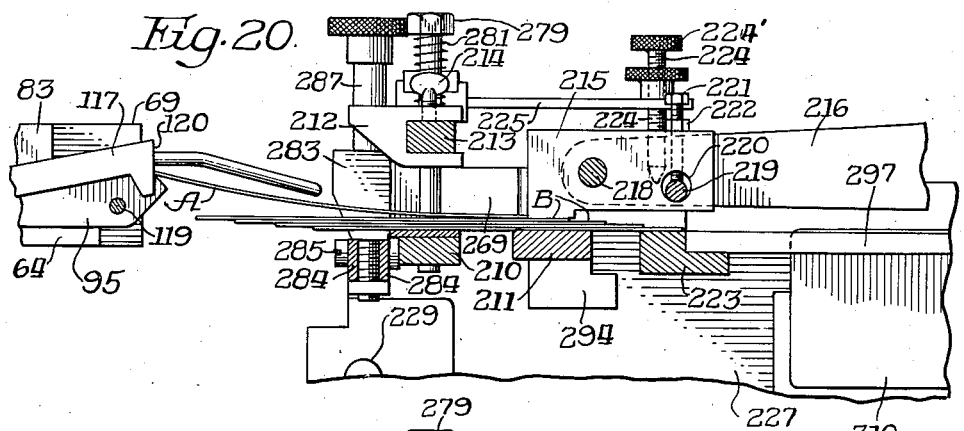
Figures 20, 21 and 22 are similar fragmentary sectional views taken on the line 20—20 of Figure 12 and showing three positions of the mechanism.
Figure 21:
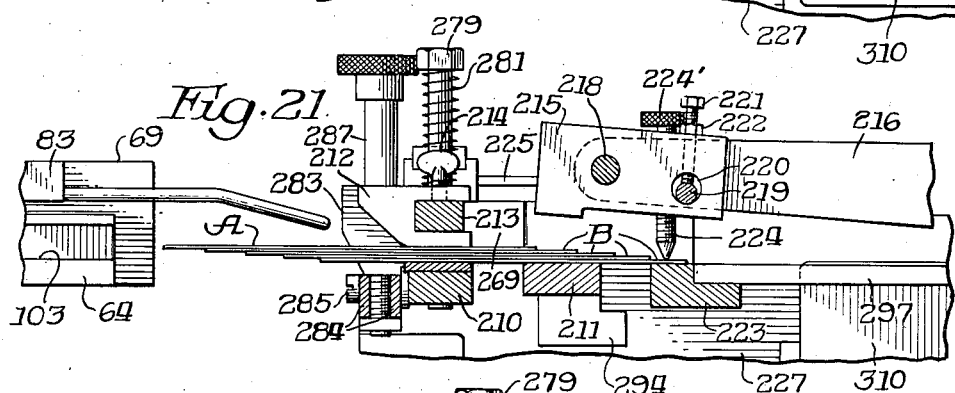
Figure 22:
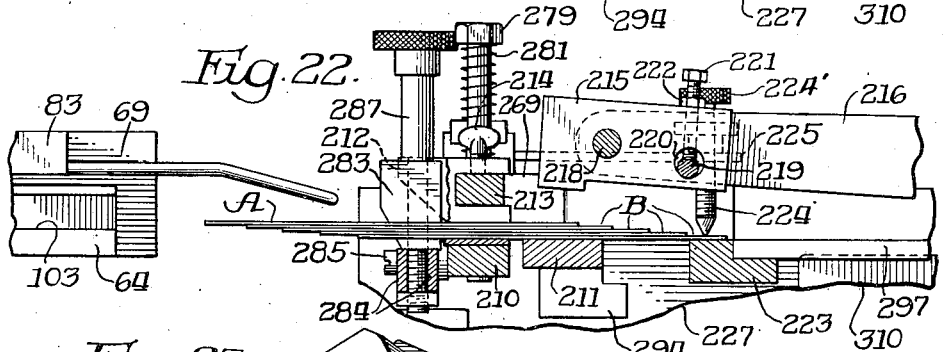

The sheets that are to be assembled together are delivered from the pusher elements 117 over a cross bar 210 and onto a shelf 211 (see Figures 20 to 22, inclusive). The cross bar 210 forms one jaw of a gripping mechanism, the other jaw of which is composed of a series of spaced members 212 on another cross bar 213, the members 212 being held by wing nuts 214 and being adjustable lengthwise of the bar 213. The bar 213 is adapted to be moved vertically from a non-gripping position as shown in Figure 20 to a gripping position as shown in Figures 21 and 22 by mechanism which will be described more fully hereinafter. Directly over the shelf 211 I provide a plurality of stop bars 215 that are vertically reciprocable by means of two supporting arms 216 that are fixed on a rock shaft 217. The stop bars 215 are pivotally secured by bolts 218 to the free ends of the arms 216 so that they may be adjusted angularly with respect to the ends of the arms. In order to provide the adjustment I provide pins 219 on the arms, which pins pass through openings 220 provided in the bars 215, the openings being somewhat larger than the pins. Adjusting screws 221 are threaded vertically through the bars 215 into the openings 220 so as to bear against the pins 219. Lock nuts 222 are provided for the adjusting screws 221 to lock them in position.

Figure 23:
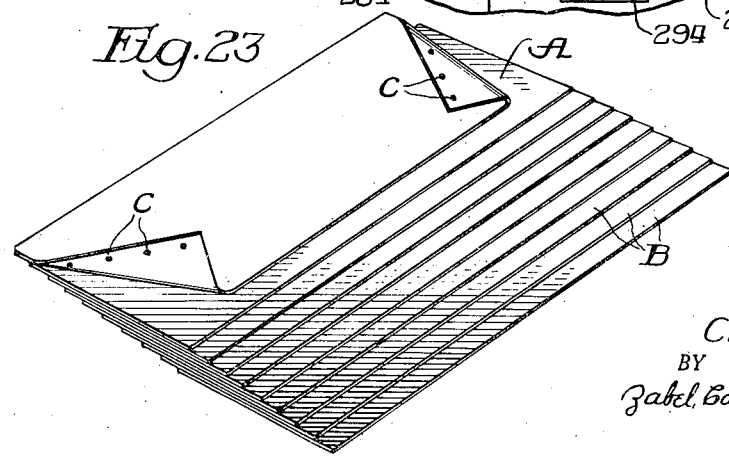
Figure 23 is a perspective view of a unit completed by the apparatus and comprising a plurality of sheets in overlapped relation with the top sheet curled back to show the manner in which the adhesive is placed thereon.

Before proceeding further with the description of the apparatus I refer to Figure 23 to illustrate the resulting unit of sheets as it is finally assembled by this apparatus. This unit of sheets consists of a plurality of like sheets A, one superposed upon another so as to provide exposed portions B of each sheet beneath the top one. These exposed narrow portions are utilized in duplicating processes to receive separate lines from a single master sheet or to serve as master sheets for imprinting the material exposed from a multiplicity of sheets onto a single sheet. In every instance the desirable characteristic of the unit strip assembly is that you may use the multiplicity of sheets as a single unit, in some process of the system for transferring information, and then separate the sheets and use them individually. The application of small spots C of adhesive to the sheets at the opposite end edges thereof makes it possible to secure them together with sufficient permanency to enable the group to be handled as a unit. Yet this method of adhering the sheets also makes it possible to separate the sheets with ease and to use them individually. There is so little build up due to the small spots of adhesive that it is not noticeable in the use of the product. Where it is desirable of course the adhered parts of the sheets may be cut off with a shear.

The most essential characteristic of the unit of sheets is accurate overlapping so that the exposed portions B are the same in width throughout an assembly of sheets. The two gripper units illustrated in Figures 20, 21 and 22 function to establish this accurate overlapping in the following manner. Initially when a sheet comes from the members 117 over the bar 210 and onto the shelf 211 the stop bars 215 are in lowered position so that the sheet is abutted against these bars as indicated by the top sheet A in Figure 20. Next the bar 213 is lowered and the members 212 are pressed against the sheet or sheets on the bar 210. The next step is a lifting of the stop members 215 followed by a movement to the right of the bars 210 and 213. The stop bars 215 remain raised until the parts reach the position shown in Figure 22 at which time the rock shaft 217 is actuated to lower the bars 215 onto the shelf 211 so as to grip a sheet thereon. The next succeeding sheet is fed in the same fashion and overlapping of the sheets is thus accomplished. As the pile of sheets grows the lower sheets are passed along onto a second shelf member 223 which is mounted to move with the bars 210 and 213 in their horizontal movement. The shelf member 223 cooperates with two holding pins 224 to insure advance of the sheets. The pins 224 are carried by a plurality of bars 225 supported on the bar 213. These pins 224 are provided with knurled heads 224' by which they may be adjusted.

The mechanism by which the gripping devices just described are operated is best shown in Figures 4, 5, 6 and 11 to 19, inclusive. Two side frames 226 and 227 are overlapped with the side pieces 23 and 24. These side pieces are coupled together by a cross bar 228 that is bolted to the side pieces 226 and 227 by two bolts 229 and 230. The cross bar 228 has two bolts 231 and 232 extending downwardly therethrough and carrying a clamping bar 233 that fits under the inside flanges of the side pieces 23 and 24 (see particularly Figure 12). The side pieces 23 and 24 have rack segments 234 and 235 bolted thereon. A shaft 236 (see Figure 14) is journaled in the side frames 226 and 227 and carries two gears 237 and 238 that ride on the rack segments 234 and 235. The shaft 236 projects through the side frame 227 and is provided with a polygonal head 239 so that it can be turned by a crank (not shown) to slide the side frames 227 and 226 longitudinally with respect to the side pieces 23 and 24. The side frames 226 and 227 carry the gripping members hereinbefore described and the adjustment of these side frames takes care of the spacing between the discharge ends of the sheet advancing members 117 and the first gripping members comprising the bar 210 and the associated members 212 on the bar 213. It will be evident that for different widths of sheets this spacing will have to be varied.

The side frame 226 has a bearing 240 thereon (see Figure 11) for the main drive shaft 37. A beveled gear 241 is keyed to the drive shaft 37 so as to be slidable thereon, the shaft being provided with a keyway 242 in order that the beveled gear 241 can move lengthwise of the shaft as the frames 226 and 227 are adjusted lengthwise of the side pieces 23 and 24. The gear 241 meshes with a gear 243 that is mounted on a stub shaft 244 which is mounted in the side frame 226. The gear 243 has a hub portion 244 on which another gear 245 is keyed (see Figure 12). The gear 245 meshes with a gear 246 which is journaled on a stub shaft 247 carried by the side frame 226. A third gear 248 is carried by a similar stub shaft 249 also mounted on the side frame 226. The gears 246 and 248 carry adjustable crank discs 250 and 251 thereon, these crank discs having crank pins 253 and 254 fixed thereon. The adjustment of the discs is accomplished by means of arcuate slots 255 and suitable screw bolts 256 that extend through the slots and are threaded into the gears 246 and 248, respectively. The crank pin 254 has a link 257 connected thereto (see Figure 11). This link is connected to one end of a rocker arm 258 that is mounted on a shaft 259, the shaft 259 extending through the frames 226 and 227 and being journaled therein. The rocker arm 258 has a portion 260 which is provided with a roller 261 at its free end for a purpose which will presently appear. At the outside of the frame 227 the shaft 259 carries a lever arm 262 which is similar in all respects to the portion 260 of the rocker arm 258 and which also carries a roller, the purpose of which will be described more fully hereinafter. Two springs 260a and 262a are connected to the arms 260 and 262 and tend to pull the lever arms upwardly at all times.

Referring now to Figure 12, the portion 260 of the rocker arm 258 and the arm 262 are shown with their corresponding rollers 261 and 263 beneath two vertically slidable pins 264 and 265 which are slidable in two brackets 266 and 267. The brackets 266 and 267 extend over the side frame 226 and 227 and are connected to slide blocks 268 and 269 that slide in grooves provided on the inner surfaces of the side frames 226 and 227. The pins 264 and 265 carry two bars 270 and 271, the bars being adjustably mounted thereon by threaded sleeves 272 and 273 into which reduced upper extensions 274 and 275 of the pins 264 and 265 are threaded. These bars 270 and 271 have pins at their outer ends to which the upper ends of the springs 260a and 262a are connected. At their inner ends the bars 270 and 271 are secured by screw bolts 276 and 277 to the cross bar 213. The rollers 261 and 263, when moved up against the lower headed end of the pins 264 and 265, lift these pins and thus by means of the bars 270 and 271 lift the cross bar 213 with its associated gripping members 212. In order to force the gripping members and the bar 213 downward I provide two posts 278 and 279 that are threaded into the bar 210 and project upwardly through the bar 213. A spring 280 is wound about the post 278 and is under compression between the head of the post and the bar 213. A similar spring 281 surrounds the post 279 and is under compression between the head of this post and the bar 213.

In front of the bar 210 and carried thereby I provide side guides 282 and 283 (Figures 12, 17, 19, 20 and 24). These side guides are carried by and adjustable lengthwise between two spaced parallel bars 284 that are secured to the bar 210 by bolts 285. Knurled headed clamping members 286 and 287 are used to clamp the guide blocks 282 and 283 in the desired position to form side guides for sheets entering the grippers.

The rocker arm 258 also serves to actuate the arms 216 by rocking the shaft 217. This is accomplished by means of a link 288 that is pivoted to the rocker arm (see Figure 11) and slidable in a cross head 289 which is pivoted on a lever arm 290 fixed to the shaft 217. A spring 291 under compression between the cross head 289 and a nut 292 on the upper end of the link 288 serves to yieldingly urge the cross head downward but to permit enough sliding between the cross head and the link 288 to accommodate the build up of sheets on the shelf 211. The shelf 211 is fastened to the side frames 226 and 227 in the manner illustrated in Figure 14 by two blocks 293 and 294 which are bolted to the side frames, the shelf being bolted to these blocks. It will be recalled that hereinbefore the slide blocks 268 and 269 were referred to as supporting the brackets 266 and 267. These blocks also carry the cross bar or shelf 223, the shelf being bolted to the blocks as illustrated best in Figure 17. The cross bar 210 is also bolted to the blocks 268 and 269 so as to move therewith when these blocks are moved lengthwise of the frames 226 and 227. It will be noted from an examination of Figures 4, 11, 14 and 17 that the blocks 268 and 269 which are secured to the brackets 266 and 267 are constrained to slide to the right as shown in Figure 11 by means of a pair of springs 295 and 296 which are fastened into hooks provided in the top of the brackets 266 and 267 and hooks provided in the top of the side frames 226 and 227.

Figure 6:
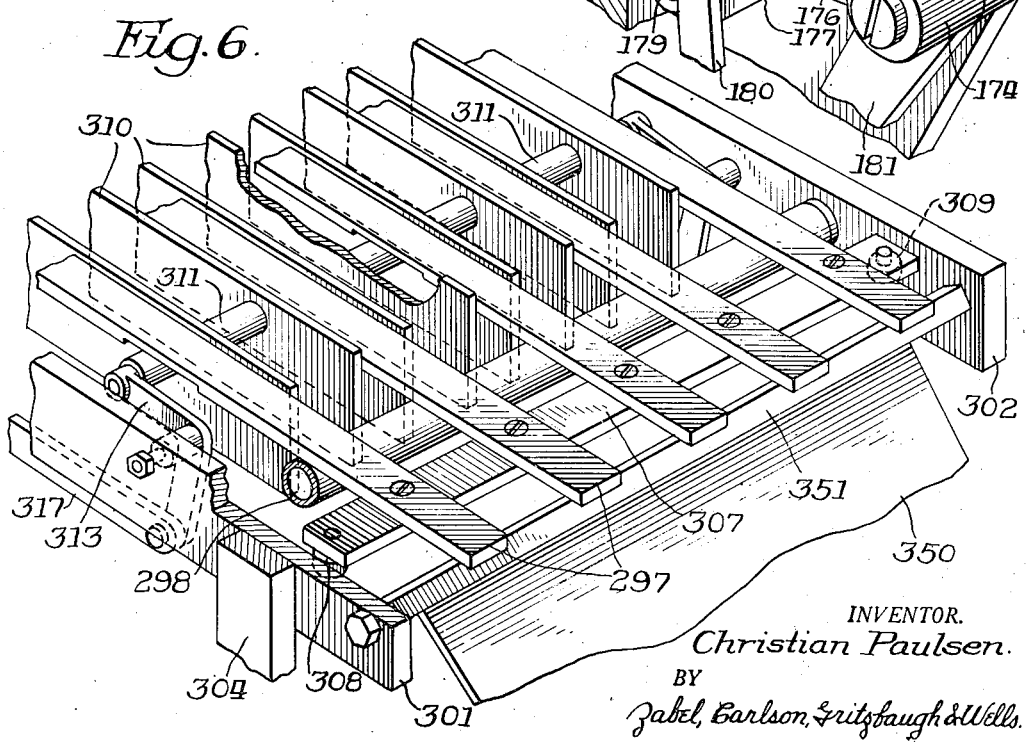
Figure 6 is a fragmentary perspective view of a portion of the apparatus shown in Figure 4.

The bar 223 serves as the supporting means for a series of strips 297 which are extended rearwardly from the bar 223 and supported at their rear ends upon a series of rollers 298, 299 and 300 (see Figures 4 and 6). The rollers just mentioned are carried by two side bars 301 and 302, the front ends of which are bolted to the side frames 226 and 227. These side bars 301 and 302 have adjustable legs 303 and 304 fastened thereto and the legs are supported on rollers 305 and 306. This is necessary because of the fact that the side bars must move with the side frames 226 and 227 toward and away from the rest of the assembling apparatus which is fixed on the base 21. At the discharge end of the strips 297 these strips are connected together by a cross bar 307 which has at its opposite ends two rollers 308 and 309 that bear against the adjacent side bars 301 and 302 to serve as a guide for the strips in their reciprocatory movement. It will be recalled that the strips 297 are fixed to the bar 233 which in turn is reciprocable with the bar 210.

Intermediate the strips 297 I arrange a series of spaced strips 310, there being two strips 310 between each adjacent pair of strips 297. These strips 310 are arranged with their long dimension vertical and are mounted in spaced relation on a pair of shafts 311 and 312. Tubular spacers are used on the shafts to properly space the strips 310 thereon. The shafts 311 and 312 are secured at their opposite ends to four bell crank levers 313, 314, 315 and 316. The bell crank levers 313 and 315 are secured together by a link 317 and similarly the bell crank levers 314 and 316 are secured together by a link 318. The bell cranks 315 and 316 are connected by a pair of links 319 to two lever arms 320 on a shaft 321. The shaft 321 has an extension 322 thereon which is connected by a short link 323 to a lever arm 324 that is fixed on the shaft 217. The effect of this linkage is to lower the strips 310 when the gripper and stop members 215 are raised, and to raise the strips 310 above the level of the strips 297 when the stop members 215 are in lowered or holding position.

The mechanism by which the sliding blocks 268 and 269 and the several parts carried thereby are reciprocated comprises rack segments 325 and 326 fixed on the brackets 266 and 267, respectively (Figures 11 and 12), a shaft 327 journaled in the side frames 226 and 227, two segmental gears 328 and 329 fixed to said shaft 327, an arm 330 integral with the gear segment 328 and extending downwardly, a link 331 pivoted to the free end of the arm 330, an arcuate arm 332 to which the link is pivotally and adjustably secured, a hub 333 journaled on a stub shaft 334, a lever arm 335 integral with the hub 333 and a link 336 connecting the free end of the lever arm 335 to the crank pin 253 on the disc 250. The stub shaft 334 is mounted on a bracket 337 that is bolted to the side frame 226. The link 331 is adjustably secured on the arm 332 by a channeled member 338 (Figure 16) and a combined pivot and clamping bolt 339.

An adjustable connection is provided between the lever arm 335 and the link 336. This connection comprises a head 340 on the lever arm 335, an elongated slot 341 in the head, a bolt 342 extending through the head, a slidable block 343 threaded to receive the bolt and a pivot pin 344 on the block 343 for the link 336. The block is adjusted by turning the bolt 342. It is locked in adjusted position by a round portion 345 engaging one face of the head 340 and a nut 346 and a washer 347 on a threaded stem 348 projecting beyond the opposite face of the head 340.

It will be noted that the gear segments 328 and 329 are in two pieces to provide for increasing and decreasing the arcuate extent of the segments when desired.

A receiving tray 350 (Figures 1, 4, 5 and 6) is connected to a cross bar 351 mounted at the outer ends of the side bars 301, 302 so that the units of sheets may be stacked thereon as they are delivered from the apparatus.

In feeding the sheets they sometimes clog (crumble up) at the point where they pass from the adhesive applying position to the overlapping gripper mechanisms. In order to prevent difficulty I provide means to stop the machine when this occurs. This means is best shown in Figures 2, 28 and 29. A bar 352 is mounted on two posts 353—354 which are threaded into the bar 162. The bar 352 extends transversely of the apparatus to about the center line thereof. A central sheet supporting strip 355 extends from directly beneath the free end of the bar to the conveyor 13. This strip is carried by the cross bars 50, 51, 52 and 53. A flat plate 356 is secured on the strip 355 beneath the bar 352 and extends forwardly as shown in Figures 2 and 28. The bar 352 carries a spring finger 357 that extends forwardly, then bends back upon itself and extends between the bar 352 and the plate 356 terminating in a downwardly sloping tip portion that extends almost to the overlapping grippers. The bar 352 carries a block of insulation 358 that has a contact strip 359 and a wiring terminal 360 thereon. The strip 359 faces down and the spring finger 357 will be pressed up against the bar if sheets clog or pile up beneath the finger. A lead 361 from the terminal extends to one terminal of a transformer 362 while the other terminal of the transformer is grounded on the side piece 24 through a lead 363. The transformer is part of a motor control unit 364 which is so constructed as to break circuit to the motor 25 when contact is made between the contact strip 359 and the finger 357. The details of the control unit 364 have not been shown since controls of this type are well known. Additional spring fingers 365, similar to the finger 357, are located at the sides of the machine adjacent to the sheet advancing members 117. These fingers are mounted in pairs, one pair being mounted on a plate 366 that is carried by the main side guide bar 66 and the other pair being mounted on a plate 367 that is carried by the main side guide bar 69.

It is believed that the nature of my invention and the advantages thereof will be clear to those skilled in the art from the foregoing description.

Having thus described my invention, what I claim as new and desire to secure by Letters Patent is:

1. An apparatus for producing a unit of accurately overlapped sheets secured together, comprising sheet supporting and guiding means, sheet advancing members spaced lengthwise of said supporting and guiding means to successively engage a sheet, said advancing members being mounted for reciprocatory movement lengthwise of the sheet supporting and guiding means, means to reciprocate said members lengthwise of said means, means for moving the members out of the path of the sheets as the same are moved in one direction and into the path of the sheets as the same are moved in the opposite direction, adhesive applying fingers, mechanism operatively connecting the fingers with the means to reciprocate said members whereby the fingers engage a defined portion of a sheet while it is stationary on said supporting and guiding means as the members are moving in the direction opposite that of the advance of the sheets and are retracted during advance of the sheets, means to supply adhesive to said fingers, sheet overlapping and pressing means comprising a pair of sheet gripping devices thereon spaced apart in the direction of advance of the sheets, the gripping device most in advance having a registering stop portion positioned, when it is in gripping position, to limit the advance of a sheet by engagement therewith of the last of said advancing members to place the portion of said sheet engaged by said fingers in a predetermined position relative to said stop portion, the other gripping device being mounted for short reciprocatory movements in the direction of advance of the sheets while in gripping position and in the opposite direction while not in gripping position, means for actuating said gripping devices alternately whereby adhesive-carrying sheets advanced to said gripping devices are pressed together in uniformly accurate overlapped relationship, and a platform receiving the overlapped sheets from said gripping devices, said platform comprising a horizontally reciprocable portion moving with the reciprocable gripping device, and a vertically reciprocable portion operable to lift the overlapped sheets from the horizontally reciprocable portion during the movement of the horizontally reciprocable portion in the direction opposite the direction of advance of the sheets.

2. An apparatus for producing a unit of accurately overlapped sheets secured together, comprising sheet supporting and guiding means, sheet advancing members spaced lengthwise of said supporting and guiding means to successively engage a sheet, said advancing members being mounted for reciprocatory movement lengthwise of the sheet supporting and guiding means, means to reciprocate said members lengthwise of said means, means for moving the members out of the path of the sheets as the same are moved in one direction and into the path of the sheets as the same are moved in the opposite direction, adhesive applying fingers, mechanism operatively connecting the fingers with the means to reciprocate said members whereby the fingers engage a defined portion of a sheet while it is stationary on said supporting and guiding means as the members are moving in the direction opposite that of the advance of the sheets and are retracted during advance of the sheets, means to supply adhesive to said fingers, sheet overlapping and pressing means comprising a pair of sheet gripping devices thereon spaced apart in the direction of advance of the sheets, the gripping device most in advance having a registering stop portion positioned, when it is in gripping position, to limit the advance of a sheet by engagement therewith of the last of said advancing members to place the portion of said sheet engaged by said fingers in a predetermined position relative to said stop portion, the other gripping device being mounted for short reciprocatory movements in the direction of advance of the sheets while in gripping position and in the opposite direction while not in gripping position, and means for actuating said gripping devices alternately whereby adhesive-carrying sheets advanced to said gripping devices are pressed together in uniformly accurate overlapped relationship.

3. An apparatus for producing a unit of accurately overlapped sheets secured together, comprising sheet supporting and guiding means, sheet advancing members spaced lengthwise of said supporting and guiding means to successively engage a sheet, said advancing members being mounted for reciprocatory movement lengthwise of the sheet supporting and guiding means, means to reciprocate said members lengthwise of said means, means for moving the members out of the path of the sheets as the same are moved in one direction and into the path of the sheets as the same are moved in the opposite direction, adhesive applying fingers, mechanism operatively connecting the fingers with the means to reciprocate said members whereby the fingers engage a defined portion of a sheet while it is stationary on said supporting and guiding means as the members are moving in the direction opposite that of the advance of the sheets and are retracted during advance of the sheets, said mechanism including means to cause the fingers not to engage one sheet after a predetermined number of sheets have been engaged thereby, means to supply adhesive to said fingers, sheet overlapping and pressing means comprising a pair of sheet gripping devices thereon spaced apart in the direction of advance of the sheets, the gripping device most in advance having a registering stop portion positioned, when it is in gripping position, to limit the advance of a sheet by engagement therewith of the last of said advancing members to place the portion of said sheet engaged by said fingers in a predetermined position relative to said stop portion, the other gripping device being mounted for short reciprocatory movements in the direction of advance of the sheets while in gripping position and in the opposite direction while not in gripping position, means for actuating said gripping devces alternately whereby adhesive-carrying sheets advanced to said gripping devices are pressed together in uniformly accurate overlapped relationship, and a platform receiving the overlapped sheets from said gripping devices, said platform comprising a horizontally reciprocable portion moving with the reciprocable gripping device, and a vertically reciprocable portion operable to lift the overlapped sheets from the horizontally reciprocable portion during the movement of the horizontally reciprocable portion in the direction opposite the direction of advance of the sheets.

4. An apparatus for producing a unit of accurately overlapped sheets secured together, comprising sheet supporting and guiding means, sheet advancing members spaced lengthwise of said supporting and guiding means to successively engage a sheet, said advancing members being mounted for reciprocatory movement lengthwise of the sheet supporting and guiding means, means to reciprocate said members lengthwise of said means, means for moving the members out of the path of the sheets as the same are moved in one direction and into the path of the sheets as the same are moved in the opposite direction, adhesive applying fingers, mechanism operatively connecting the fingers with the means to reciprocate said members whereby the fingers engage a defined portion of a sheet while it is stationary on said supporting and guiding means as the members are moving in the direction opposite that of the advance of the sheets and are retracted during advance of the sheets, said mechanism including means to cause the fingers not to engage one sheet after a predetermined number of sheets have been engaged thereby, means to supply adhesive to said fingers, sheet overlapping and pressing means comprising a pair of sheet gripping devices thereon spaced apart in the direction of advance of the sheets, the gripping device most in advance having a registering stop portion positioned, when it is in gripping position, to limit the advance of a sheet by engagement therewith of the last of said advancing members to place the portion of said sheet engaged by said fingers in a predetermined position relative to said stop portion, the other gripping device being mounted for short reciprocatory movements in the direction of advance of the sheets while in gripping position and in the opposite direction while not in gripping position, and means for actuating said gripping devices alternately whereby adhesive-carrying sheets advanced to said gripping devices are pressed together in uniformly accurate overlapped relationship.

5. An apparatus for producing a unit of accurately overlapping sheets secured together, comprising sheet supporting and guiding means, sheet advancing members spaced lengthwise of said supporting and guiding means to successively engage a sheet, said advancing members being mounted for reciprocatory movement lengthwise of the sheet supporting and guiding means, for moving the members, said members and same cooperating with the bed to move the members out of the path of the sheets as the same are moved in one direction and into the path of the sheets as the devices are moved in the opposite direction, adhesive applying fingers, mechanism operatively connecting the fingers with the means to reciprocate said members whereby the fingers engage a defined portion of a sheet while it is stationary on said supporting and guiding means as the members are moving in the direction opposite that of the advance of the sheets and are retracted during advance of the sheets, means to supply adhesive to said fingers, sheet overlapping and pressing means comprising a pair of sheet gripping devices thereon spaced apart in the direction of advance of the sheets, the gripping device most in advance having a registering stop portion positioned, when it is in gripping position, to limit the advance of a sheet by engagement therewith of the last of said advancing members to place the portion of said sheet engaged by said fingers in a predetermined position relative to said stop portion, the other gripping device being mounted for short reciprocatory movements in the direction of advance of the sheets while in gripping position and in the opposite direction while not in gripping position, means operable to stop the further advance of sheets by said gripping devices when the advancing members fail to deliver a sheet to said gripping devices, and means for actuating said gripping devices alternately whereby adhesive-carrying sheets advanced to said gripping devices are pressed together in uniformly accurate overlapped relationship.

6. An apparatus for producing a unit of accurately overlapped sheets secured together, comprising means for positively advancing sheets in spaced relation from a stack of said sheets, means for applying adhesive to said sheets at defined distances from the forward edges thereof, a pair of sheet gripping devices spaced apart in the direction of advance of the sheets, the gripping device most remote from the advancing sheets having a registering stop portion against which said advancing means delivers the forward edge of each sheet, said gripping device having the stop being movable between a lowered gripping position and a raised releasing position, means operable to close the other gripping device on sheets already advanced while the gripping device having said stop portion is in lowered position, means to raise said gripping device having said stop portion thereon after said other gripping device is closed and subsequent to delivery of each sheet into engagement with said stop portion mechanism operable to move said other gripping device in the direction of advance of the sheets after it is closed and while said gripping device having said stop portion is raised, means operable to close the gripping device carrying the registering stop after the other gripping device has been advanced, and means to thereafter open said other gripping device and return it to its original position.

7. A sheet overlapping apparatus comprising means engaging the rear edges of individual sheets to advance the same, a pair of sheet gripping devices spaced apart in the direction of advance of the sheets, the gripping device most remote from the advancing sheets having a vertically adjustable registering stop portion against which said advancing means pushes the forward edge of each sheet, said gripping device having the stop being movable between a lowered gripping position and a raised releasing position, means operable to close the other gripping device on sheets already advanced while the gripping device having said stop portion is in lowered position, means to raise said gripping device having said stop portion thereon after said other gripping device is closed and subsequent to delivery of each sheet into engagement with said stop portion mechanism operable to move said other gripping device in the direction of advance of the sheets after it is closed and while said gripping device having said stop portion is raised, means operable to close the gripping device carrying the registering stop after the other gripping device has been advanced, and means to thereafter open said other gripping device and return it to its original position.

8. In an apparatus for producing a unit of accurately overlapped sheets secured together, sheet overlapping and pressing means receiving sheets to each of which adhesive has been applied in a zone thereof within a predetermined distance from the forward edge thereof, said overlapping and pressing means comprising a pair of sheet gripping devices spaced apart in the direction of advance of the sheets, the more remote gripping device having a registering stop portion positioned, when it is in gripping position, to limit the advance of a sheet, the other gripping device being mounted for short reciprocatory movements in the direction of advance of the sheets while in gripping position and in the opposite direction while not in gripping position, means for actuating said gripping devices alternately whereby adhesive-carrying sheets advanced to said gripping devices are pressed together in uniformly accurate overlapped rela- tionship with the adhesive carrying portion of one sheet overlapping a preceding sheet, and a platform receiving the overlapped sheets from said gripping devices, said platform comprising a horizontally reciprocable portion moving in unison with the reciprocable gripping device, and a vertically reciprocable portion operable to lift the overlapped sheets from the horizontally reciprocable portion during the movement of the horizontally reciprocable portion in the direction opposite the direction of advance of the sheets.

9. In a sheet overlapping means adapted to position a series of sheets, advanced thereto singly in spaced relation, in a group with a like portion of each sheet below the top sheet exposed when viewed from the top, said means comprising a pair of sheet transversely extending supporting bars spaced apart in the direction of advance of said sheets, means for reciprocating said bars in unison in said direction, a fixed sheet supporting member between said reciprocating bars, a combined gripping and positioning stop means over said fixed member, means operable to lift and lower said means, gripping members over each of said reciprocable bars reciprocable therewith and adapted when lowered thereon to secure sheets on said reciprocable bars for movement with the bars, and means to lift and lower said reciprocable gripping members in timed relation to the reciprocation of said reciprocating bars and the lifting and lowering of the positioning stop means.

10. In an apparatus for producing a unit of accurately overlapped sheets secured together, sheet overlapping means adapted to position a series of sheets having adhesive applied to a zone of each thereof within a predetermined distance from the forward edge thereof, advanced thereto singly in spaced relation, in a group with a like portion of each sheet below the top sheet exposed when viewed from the top, said means comprising a pair of sheet transversely extending supporting bars spaced apart in the direction of advance of said sheets, means for reciprocating said bars in unison in said direction, a fixed sheet supporting member between said reciprocating bars, stop means over said fixed member, means operable to raise and lower the stop means, means cooperating with said reciprocable bars to clamp sheets thereto while said bars move in sheet advancing direction, said stop means cooperating with said fixed member to clamp said sheets thereto during return movement of said bars, and a conveyor receiving the assembled secured sheets from said reciprocating bars, comprising one set of supports mounted for movement with the bars, another set of supports between the supports of the first named set, and means movable in timed relation to the movement of said bars to position the last named supports below the level of the first named supports while the reciprocating bars are moving in sheet advancing direction and to raise them above the first named supports while the bars are returning to their original positions.

11. In a sheet overlapping means adapted to position a series of sheets, advanced thereto singly in spaced relation, in a group with a like portion of each sheet below the top sheet exposed when viewed from the top, said means comprising a pair of sheet transversely extending supporting bars spaced apart in a direction of advance of said sheets, means for reciprocating said bars in unison in said direction, a fixed sheet supporting member between said reciprocating bars, sheet stop means over said fixed member, a lever, said sheet stop means being pivoted on said lever and adjustable about its pivot, said lever being operable to raise and lower the stop means, power means actuating said lever including a driving connection yielding upon downward movement of said stop means to accommodate varying thicknesses between the stop means and the fixed member, and means cooperating with said reciprocable bars to hold sheets thereon while said bars move in sheet advancing direction, said stop means cooperating with said fixed members to clamp said sheets thereto during return movement of said bars.

12. In a sheet overlapping means adapted to position a series of sheets, advanced thereto singly in spaced relation, in a group with a like portion of each sheet below the top sheet exposed when viewed from the top, said means comprising a pair of sheet transversely extending supporting bars spaced apart in the direction of advance of said sheets, means supporting said bars for reciprocating movement in said direction, a rack connected to both said bars, means to impart a predetermined reciprocation of said rack whereby to give said bars the desired reciprocatory movement in unsion, a fixed sheet supporting member between said reciprocating bars, a combined gripping and positioning stop means over said fixed member, means operable to lift and lower said means, gripping members over each of said reciprocable bars reciprocable therewith and adapted when lowered thereon to secure sheets on said reciprocable bars for movement with the bars, and means to lift and lower said reciprocable gripping members in timed relation to the reciprocation of said reciprocating bars and the lifting and lowering of the positioning stop means.

13. In a sheet overlapping means comprising horizontally reciprocating sheet supporting and gripping means operable on advance stroke to grip sheets thereon and carry them forward and operable on return stroke to release the advanced sheets, combined gripping and positioning stop means including a fixed sheet support between the ends of said reciprocating sheet supporting means, a stop member over said fixed support, means for pushing a series of sheets singly with their forward edges into engagement with said stop member, said stop member being movable upward to permit advance of sheets on the advance stroke of said reciprocating means and normally held in lowered position to clamp sheets to said fixed support during the return stroke of the reciprocating supporting means, and means for actuating said pushing means in timed relation to the movement of said stop member to advance said sheets toward said stop member only when said stop member is in lowered position.

14. In a sheet feeding device, a framework having two spaced parallel longitudinally extending sheet supports, parallel longitudinally extending side sheet guides on said framework, spaced feed members adjacent each of said side guides, supporting bars for said members mounted for reciprocating movement on said framework below the top of said sheet supports, said feed members being mounted on said bars for movement between a position in which the same project above and a position in which the same lie entirely below said sheet supports, cooperating means on the members, bars and framework, operable to project the members above said sheet supports upon movement of said bars in one direction and to lower the members below the sheet supports upon movement of the bars in the opposite direction, strips pivoted on the side guides engaging the top faces of said sheets to hold said sheets stationary while the bars are moved in the direction to lower the feed members, and power means for reciprocating said bars.

15. In a sheet feeding device, a framework having two pairs of spaced parallel longitudinally extending sheet supports, parallel longitudinally extending side sheet guides on said framework, spaced feed members adjacent each of said side guides, supporting bars for said members mounted for reciprocating movement on said framework between each pair of said sheet supports below the top surfaces thereof, said feed members being mounted on said bars for movement between a position in which the same project above and a position in which the same lie entirely below said sheet supports, cooperating means on the members, bars and framework, operable to project the members above said sheet supports upon movement of said bars in one direction and to lower the members below the sheet supports upon movement of the bars in the opposite direction, means mounting the supports and associated side guides, bars and feed members for adjustment toward and away from each other as a unit transversely of said device comprising spaced shafts, the supports having threaded members screw threadedly engaging said shafts to move in opposite directions therealong upon rotation of said shafts, means to turn the shafts in unison, and power means for reciprocating said bars.

16. In a device for applying adhesive to individual sheets at defined points along a side edge thereof, a framework having two spaced parallel sheet supports, side guides on said framework, feed members adjacent said side guides, means for reciprocating the same, means operable to project the members above said sheet supports into position to engage the rear edges of said sheets to move said sheets to a predetermined position upon movement of said members in one direction and to lower the members below the sheet supports upon movement of the same in the opposite direction, means to hold said sheets fixed relative to said side guides upon release thereof by said members, an adhesive container attached to one of said sheet supports, adhesive applying fingers movably mounted in said container for movement between a lowered position near the bottom of the container and a raised position adjacent the support to engage a sheet on said support, means to raise the adhesive applying fingers into engagement with said sheet and lower the same while the feed members are lowered and said sheet is stationary, and power means for reciprocating said feed members and finger raising and lowering means.

17. In a device for applying adhesive to individual sheets at defined points along a side edge thereof, a framework having two spaced parallel sheet supports, side guides on said framework, spaced feed members adjacent said side guides, supporting bars for said members mounted for reciprocating movement on said framework, cooperating means on the members, bars and framework, operable to project the members above said sheet supports upon movement of said bars in one direction and to lower the members below the sheet supports upon movement of the bars in the opposite direction, said sheet supports and their associated side guides, bars and feed members being movable toward and away from each other transversely of said device to accommodate sheets of different widths, an adhesive container attached to one of said sheet supports to move therewith upon adjustment of the same toward and away from each other, adhesive applying fingers movably mounted in said container for movement between a lowered position near the bottom of the container and a raised position adjacent the support to engage a sheet on said support, means to raise the adhesive applying fingers into engagement with said sheet and lower the same while the feed members are lowered and said sheet is stationary, and power means for reciprocating said bars and finger raising and lowering means.

18. In a device for applying adhesive to individual sheets at defined points along a side edge thereof, a framework having two spaced parallel sheet supports, side guides on said framework, adjacent said supports, spaced feed members adjacent said side guides adapted to engage the rear edges of said sheets on said supports, supporting bars for said members mounted for reciprocating movement on said framework, cooperating means on the members, bars and framework, operable to project the members above said sheet supports into sheet engaging position upon movement of said bars in one direction and to lower the members below the sheet supports upon movement of the bars in the opposite direction, strips pivoted on the side guides for holding sheets stationary between the same and said guides while the bars are moved in the direction to lower the feed members, an adhesive container attached to one of said sheet supports, adhesive applying fingers movably mounted in said container for movement between a lowered position near the bottom of the container and a raised position adjacent the support to engage a sheet on said support, means to raise the adhesive applying fingers into engagement with said sheet and lower the same while the feed members are lowered and said sheet is stationary, and power means for reciprocating said bars and finger raising and lowering means.

19. In a device of the character described, a framework, sheet advancing and guiding means thereon, adhesive applying means on said framework operable to apply adhesive to a sheet while it is stationary in one position on said guiding means, means for overlapping said sheets to secure the same together in overlapped position, said advancing means delivering said sheets from the adhesive applying position to said overlapping means singly, and control means effective upon failure of sheets to pass on from the adhesive applying position to render the sheet advancing means inoperative.

20. In a sheet feeding and assembling machine, a framework, means on said framework for supporting and guiding sheets along a definite path, sheet advancing means operable to move sheets singly step by step along said path in steps greater than the dimension of a sheet lengthwise of said path, adhesive applying means on said framework operable to apply adhesive to a sheet while it is stationary in a predetermined position on said path, a second framework connected to the first framework to receive the sheets therefrom, stop means on said second framework, means engaging the rear edges of the sheets moving one sheet at a time from said position through a predetermined distance to said second framework with its forward edge into engagement with said stop means, overlapping means comprising sheet advancing means on said second framework cooperating with said stop means to register each sheet delivered to said second framework in overlapping relation to the next previously delivered sheet, and means to press the overlapped sheets together, and receiving means for units of said overlapped sheets mounted to move said units in unison with the advancing means of said overlapping means.

21. A machine for producing a unit of accurately overlapped sheets secured together in overlapped relation, comprising positive means for advancing sheets of defined length in spaced relation to a predetermined station, including means engaging with the rear edge of one of said sheets at a time, means for moving said advancing means through a predetermined distance in an advancing direction to push said sheets one at a time to said station, means at said station for applying adhesive to the sheet at said station at points at predetermined distances from the forward edge of said sheet while stationary, a stop in advance of said station, means for moving each sheet from said station and positively advancing said sheet comprising means engaging the rear edge thereof and means for moving said last mentioned advancing means through a predetermined distance to engage the forward edge of said sheet with said stop, said stop gauging the overlap of the sheets of said unit, means for overlapping said sheets and securing the same in overlapped relation, comprising means for successively advancing the forward edge of each sheet a predetermined distance beyond said gauging stop, said means clamping said sheet thereto to move said predetermined distance in unison therewith in advancing direction, and means moving in unison with said clamping means and engaging the units discharged by said overlapping means while moving in advancing direction to carry overlapped and adhesively secured sheets of a unit away from said overlapping means.

22. A machine for producing a unit of accurately overlapped sheets secured together in overlapped relation, comprising positive means for advancing sheets of defined length in spaced relation to a predetermined station, including means engaging with the rear edge of one of said sheets at a time, means for moving said advancing means through a predetermined distance in an advancing direction to push said sheets one at a time to said station, and returning said advancing means to starting position with the sheet engaging means retracted from sheet engaging position during the return movement thereof, means at said station for applying adhesive to the sheet at said station at points at predetermined distances from the forward edge of said sheet while stationary, a stop in advance of said station, means for moving each sheet from said station and positively advancing said sheet comprising means engaging the rear edge thereof and means for moving said last mentioned advancing means through a predetermined distance to engage the forward edge of said sheet with said stop, said stop gauging the overlap of the sheets of said unit, means for overlapping said sheets and securing the same in overlapped relation, comprising means for successively advancing the forward edge of each sheet a predetermined distance beyond said gauging stop, said means clamping said sheet thereto to move said predetermined distance in unison therewith in advancing direction, and means moving in unison with said clamping means and engaging the units discharged by said overlapping means while moving in advancing direction to carry overlapped and adhesively secured sheets of a unit away from said overlapping means.

23. A machine for producing a unit of accurately overlapped sheets secured together in overlapped relation comprising positive means for advancing sheets of defined length in spaced relation to a predetermined station, including means engaging with the rear edge of one of said sheets at a time, means for moving said advancing means through a predetermined distance in an advancing direction to push said sheets one at a time to said station, means at said station for applying adhesive to the sheet at said station at points at predetermined distances from the forward edge of said sheet while stationary, a stop in advance of said station, means for moving each sheet from said station and positively advancing said sheet comprising means engaging the rear edge thereof and means for moving said last mentioned advancing means through a predetermined distance to engage the forward edge of said sheet with said stop, and returning said advancing means to starting position with the sheet engaging means retracted from sheet engaging position during the return movement thereof, said stop gauging the overlap of the sheets of said unit, means for overlapping said sheets and securing the same in overlapped relation, comprising means for successively advancing the forward edge of each sheet a predetermined distance beyond said gauging stop, said means clamping said sheet thereto to move said predetermined distance in unison therewith in advancing direction, and means moving in unison with said clamping means and engaging the units discharged by said overlapping means while moving in advancing direction to carry overlapped and adhesively secured sheets of a unit away from said overlapping means.

24. A machine for producing a unit of accurately overlapped sheets secured together in overlapped relation, comprising positive means for advancing sheets of defined length in spaced relation to a predetermined station, including means engaging with the rear edge of one of said sheets at a time, means for moving said advancing means through a predetermined distance in an advancing direction to push said sheets one at a time to said station, means at said station for applying adhesive to the sheet at said station at points at predetermined distances from the forward edge of said sheet while stationary, a stop in advance of said station, means for moving each sheet from said station and positively advancing said sheet comprising means engaging the rear edge thereof and means for moving said last mentioned advancing means through a predetermined distance to engage the forward edge of said sheet with said stop, said stop gauging the overlap of the sheets of said unit, means for overlapping said sheets and securing the same in overlapped relation, comprising means for successively advancing the forward edge of each sheet a predetermined distance beyond said gauging stop, said means clamping said sheet thereto to move said predetermined distance in unison therewith in advancing direction, said stop comprising means adapted to engage said sheet to hold said sheet in fixed position, means for successively moving said stop means to sheet holding position, releasing said clamping means from said sheet, returning said clamping means to starting position, engaging said clamping means with the next succeeding sheet, and moving said stop means from sheet holding position, and means moving in unison with said clamping means and engaging the units discharged by said overlapping means while moving in advancing direction to carry overlapped and adhesively secured sheets of a unit away from said overlapping means.

25. A machine for producing a unit of accurately overlapped sheets secured together in overlapped relation, comprising positive means for advancing sheets of defined length in spaced relation to a predetermined station, including means engaging with the rear edge of one of said sheets at a time, means for moving said advancing means through a predetermined distance in an advancing direction to push said sheets one at a time to said station, means at said station for applying adhesive to the sheet at said station at points at predetermined distances from the forward edge of said sheet while stationary, a stop in advance of said station, means for moving each sheet from said station and positively advancing said sheet comprising means engaging the rear edge thereof and means for moving said last mentioned advancing means through a predetermined distance to engage the forward edge of said sheet with said stop, said stop gauging the overlap of the sheets of said unit, means for overlapping said sheets and securing the same in overlapped relation, comprising reciprocating means for successively advancing the forward edge of each sheet a predetermined distance beyond said gauging stop, said means clamping said sheet thereto to move said predetermined distance in unison therewith in advancing direction but releasing said sheet during return movement thereof, and means moving in unison with said clamping means and engaging the units discharged by said overlapping means while moving in advancing direction but disengaging said units during return movement thereof to carry overlapped and adhesively secured sheets of a unit away from said overlapping means.

26. A machine for producing a unit of accurately overlapped sheets secured together in overlapped relation, comprising positive means for advancing sheets of defined length in spaced relation to a predetermined station, including means engaging with the rear edge of one of said sheets at a time, means for moving said advancing means through a predetermined distance in an advancing direction to push said sheets one at a time to said station, means at said station for applying adhesive to the sheet at said station at points at predetermined distances from the forward edge of said sheet while stationary, a stop in advance of said station, means for moving each sheet from said station and positively advancing said sheet comprising means engaging the rear edge thereof and means for moving said last mentioned advancing means through a predetermined distance to engage the forward edge of said sheet with said stop, said stop gauging the overlap of the sheets of said unit, and means cooperating with said stop to overlap said sheets and secure the same in overlapped relation.

27. In a device for applying adhesive to a plurality of individual sheets successively at defined points along a side edge thereof, reciprocable means for feeding sheets one at a time in spaced relation to a defined station comprising a stationary guide member, clamping fingers pivoted near one end thereof to said guide member to overlie the sheets and inclined in the direction of feed for fixing said sheets to said guide member to hold the same stationary at said station during return movement of the feeding means, adhesive containers, adhesive applying fingers movable from within said containers into a position to transfer adhesive from said containers to the under side of a sheet at said station, and means operating in timed relation to said feeding means to move said applying fingers into engagement with said sheet at said station while said sheet is held stationary.

28. In a device for applying adhesive to a plurality of individual sheets successively at defined points along a side edge thereof, reciprocable means for feeding sheets one at a time in spaced relation to a defined station comprising a stationary guide member, clamping fingers pivoted near one end thereof to said guide member to overlie the sheets and inclined in the direction of feed for fixing said sheets to said guide member to hold the same stationary at said station during return movement of the feeding means, adhesive containers, rock shafts in said containers, adhesive applying fingers on said shafts and operable by rocking movement of the shafts to transfer adhesive from the containers to the under side of the sheet at said station, and means to rock said shafts to engage said applying fingers with said sheet while held stationary at said station.

CHRISTIAN PAULSEN.

REFERENCES CITED

The following references are of record in the file of this patent:

UNITED STATES PATENTS

| Number | Name | Date |
|---|---|---|
| 438,838 | Chapin | Oct. 21, 1890 |
| 1,131,836 | Heywood et al. | Mar. 16, 1915 |
| 1,236,054 | Clark | Aug. 7, 1917 |
| 1,345,664 | Calleson | July 6, 1920 |
| 1,584,020 | Duncan | May 11, 1926 |
| 1,807,843 | Hendrickson | June 2, 1931 |
| 1,935,031 | Joslin | Nov. 14, 1933 |
| 2,205,443 | Paulsen | June 25, 1940 |
| 2,222,983 | Marchev | Nov. 26, 1940 |
| 2,260,582 | Roethe | Oct. 28, 1941 |
| 2,277,924 | Morrison | Mar. 31, 1942 |
| 2,394,935 | Palmer | Feb. 12, 1946 |

Certificate of Correction

Patent No. 2,476,250 July 12, 1949

CHRISTIAN PAULSEN

It is hereby certified that errors appear in the printed specification of the above numbered patent requiring correction as follows:

Column 16, line 31, for the word "overlapping" read *overlapped*; line 42, for "devices" read *same*; column 18, line 17, lines 42 and 43, line 71, and column 19, line 20, for "a pair of sheet transversely extending" read *a pair of transversely extending sheet*; column 19, line 13, for "members" read *member*;

and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*